United States Patent [19]

Griffis et al.

[11] Patent Number: 5,179,525
[45] Date of Patent: Jan. 12, 1993

[54] METHOD AND APPARATUS FOR CONTROLLING GEOMETRICALLY SIMPLE PARALLEL MECHANISMS WITH DISTINCTIVE CONNECTIONS

[75] Inventors: Michael W. Griffis; Joseph Duffy, both of Gainesville, Fla.

[73] Assignee: University of Florida, Gainesville, Fla.

[21] Appl. No.: 517,371

[22] Filed: May 1, 1990

[51] Int. Cl.$^5$ ............................................. G06F 15/20
[52] U.S. Cl. ..................................... 364/512; 364/578
[58] Field of Search .................. 364/578, 167.01, 512; 248/371, 163.1, 637, 651, 396, 550; 434/58, 55

[56] References Cited

U.S. PATENT DOCUMENTS

| | | | |
|---|---|---|---|
| Re. 27,051 | 2/1971 | Cappel | 434/58 |
| 3,159,968 | 12/1964 | Welles | 60/228 |
| 3,229,941 | 1/1966 | Suliteanu et al. | 248/163.1 |
| 3,419,238 | 12/1968 | Flory | 248/163.1 |
| 3,952,979 | 4/1976 | Hansen | 248/550 |
| 3,967,387 | 7/1976 | Marchegiani | 434/58 |
| 4,343,610 | 8/1982 | Chou | 434/58 |
| 4,360,182 | 11/1982 | Titus | 248/371 |
| 4,576,577 | 3/1986 | Lam et al. | 434/58 |
| 4,651,589 | 3/1987 | Lambert | 248/178 X |
| 4,848,525 | 7/1989 | Jacot et al. | 248/550 X |
| 5,021,982 | 6/1991 | Crosbie et al. | 364/578 |

OTHER PUBLICATIONS

Stewart, "A Platform with Six Degrees of Freedom", Proc. Inst. Mech. Engr. (1965-66), vol. 180 Pt. 1 No. 15, pp. 371-378.
Griffis and Duffy, "A Forward Displacement Analysis of a Class of Stewart Platforms", Journal of Robotic Systems vol. 6, No. 6, pp. 703-720 (1989).
Nanua et al., "Direct Kinematic Solution of a Stewart Platform", 1989 IEEE Intl. Conf. on Robotics and Automation, Scottsdale, Ariz. (May 1989), pp. 431-437.
Miura et al., "Variable Geometry Truss and its Application to Deployable Truss and Space Crane Arm", Proc. 35th Congress of the International Astronautical Federation, American Institute of Aeronautics and Astronautics, Oct. 7-13, 1984, pp. 1-9.

*Primary Examiner*—Parshotam S. Lall
*Assistant Examiner*—Ellis B. Ramirez
*Attorney, Agent, or Firm*—Spensley, Horn, Jubas & Lubitz

[57] ABSTRACT

A system, method and apparatus for controlling, via a closed-form forward displacement computation, the position and orientation of a movable platform of a parallel mechanism. A movable platform is supported above a base platform by a plurality of parallel support legs such as linear actuators. The dimensions of the base platform and the movable platform, as well the lengths of the support legs, are provided to a control system. The control system is operative to compute at least one closed-form forward displacement solution of the geometry of a polyhedron (an octahedron for the disclosed embodiments) formed by the movable platform, the base platform, and the support legs. The control system determines a final position and orientation of the movable platform by eliminating imaginary roots of the closed-form solutions and roots which would result in discontinuous paths of travel for the movable platform. A novel special 6-6 parallel mechanism is also disclosed. The control system is suitable for controlling known 3-3 or 6-3 Stewart platforms in a novel manner, as well as controlling the novel special 6-6 parallel mechanism. The special 6-6 parallel mechanism is distinguished from a general 6-6 by the fact that it is geometrically reducible to an octahedron, and therefore it has a simple geometry, even though its legs possess distinct connections. Also disclosed is a method for reducing the novel special 6-6 parallel mechanism to a Stewart platform equivalent, which is then controlled by the disclosed closed-form forward displacement control system.

60 Claims, 14 Drawing Sheets

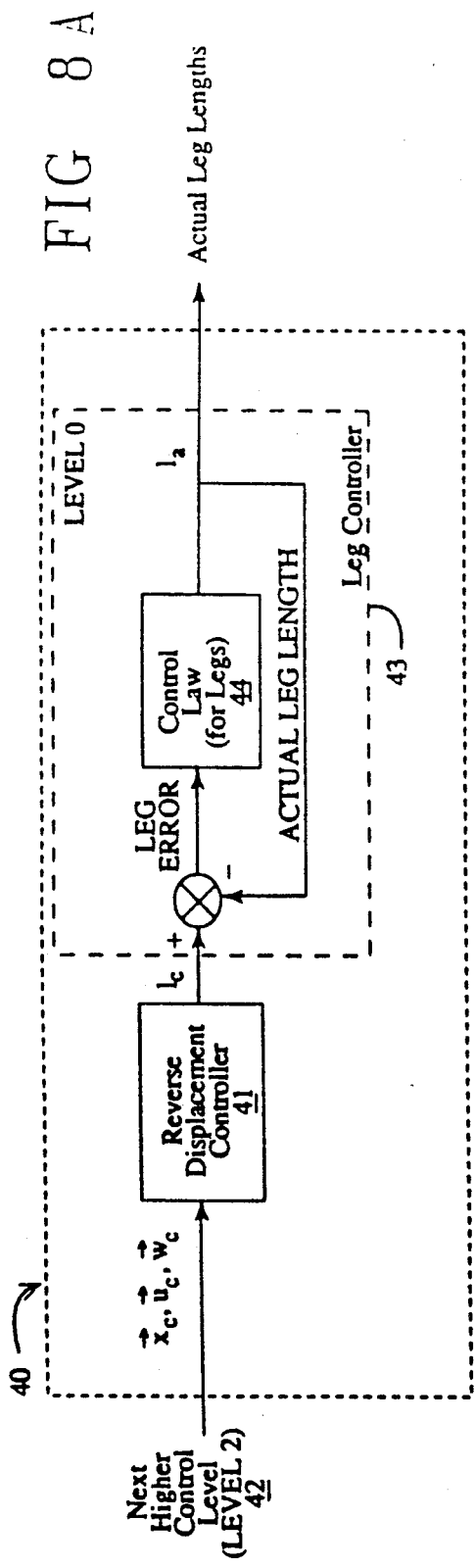
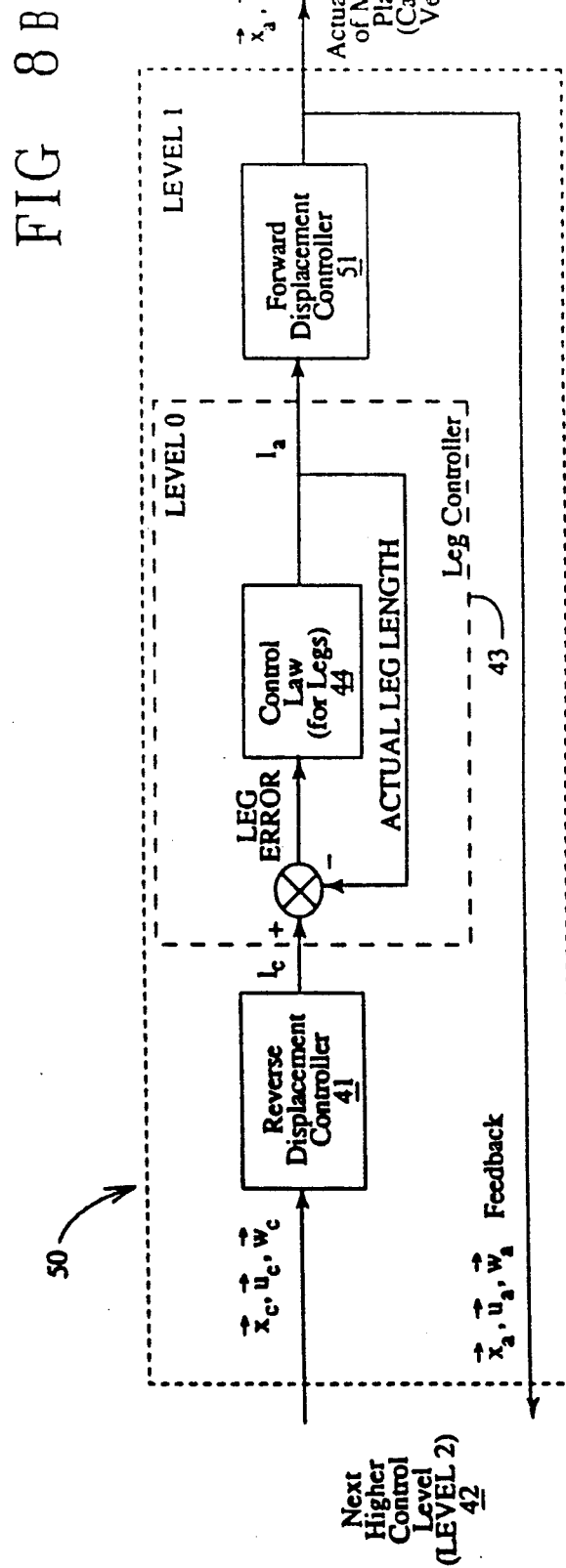

METHOD AND APPARATUS FOR CONTROLLING GEOMETRICALLY SIMPLE PARALLEL MECHANISMS WITH DISTINCTIVE CONNECTIONS

TECHNICAL FIELD

This invention relates generally to parallel mechanisms, and relates in particular to methods and apparatus for controlling mechanical devices comprising two platforms connected together, through a special geometry, by a plurality of legs acting in-parallel. The preferred embodiments described herein may be used, among other things, as a cargo handler, a force/torque sensor, a robotic manipulator, or a flight training simulator.

BACKGROUND OF THE INVENTION

Recently, there has been an increasing interest in direct applications of parallel mechanisms to real-world industrial problems. In situations where the needs for accuracy and sturdiness dominate the requirement of a large workspace, parallel mechanisms present themselves as viable alternatives to their serial counterparts.

Parallel mechanisms generally comprise two platforms which are connected by a plurality of prismatic joints or legs acting in-parallel. The most common configuration comprises six legs, and the legs are linear actuators such as hydraulic cylinders. One of the platforms is defined as the "movable platform," which has six degrees of freedom relative to the other platform, which is the "base." With six degrees of freedom, the movable platform is capable of moving in three linear directions and three angular directions singularly or in any combination.

When the locations of the connection points of the prismatic legs are known for both platforms, and when a means to change and sense the lengths of the six prismatic legs is provided, then closed-loop control of the position and orientation of the movable platform relative to the base platform is possible and depends on the solutions to two geometrical computations. First, when a desired position and orientation of the movable platform is known, then the corresponding desired lengths of the six legs are determined via a so-called "reverse displacement analysis."

On the other hand, when the actual leg lengths are known, the determination of the actual position and orientation of the movable platform is accomplished via a so-called "forward displacement analysis." Because there are multiple mathematical solutions to this problem (i.e., different possible geometric closures), it is clear that the forward displacement analysis is far more complicated than the reverse analysis. Because of the complexities of such parallel devices, the present inventors believe that for the closed-loop control of the position and orientation of the movable platform, the prior art only successfully utilizes an iterative forward displacement analysis together with the simpler reverse displacement analysis.

An iterative methodology for accomplishing the forward displacement analysis has many drawbacks. First, the solution is not obtained in a prescribed fixed amount of time. Iterative solutions to the mathematics of devices of this type typically are conducted with multidimensional searches, which are extremely time consuming and have no constant search time. For those that study closed-loop control systems, it is well known that timing is critical.

Second, an iterative solution depends on good initial guesses of the position and orientation of the movable platform. To combat this, it is customary to use the last known actual position and orientation as an initial guess to ascertain the "new" actual position and orientation. However when using this technique, it is possible that the mechanism can "run away" from the iterative algorithm. Whenever the legs are able to move faster than the iterative algorithm can manage, the algorithm will have difficulty reporting the actual position and orientation of the movable platform.

Third, an iterative solution has no way of determining regions of mechanism singularities, which are regions where the movable platform cannot be fully constrained no matter what the forces in the legs may be. Singularities such as these cause static instabilities in parallel mechanisms. Multiple closures can exist in these regions. This will cause numerical problems in the iterative algorithm, because the algorithm can actually report the mechanism to be in a wrong closure. Stated in other words, there is no mathematical way of determining closures in an iterative algorithm.

One prior art parallel mechanism is known as a "Stewart" platform. This configuration was introduced in 1965 for use in an aircraft simulator. Since then, numerous parallel mechanisms containing prismatic joints have been called Stewart platforms, although D. Stewart originally suggested only two different arrangements. Stewart's two suggested arrangements were a 3-3 platform (see FIGS. 1 and 2) and a 6-3 platform (see FIGS. 3 and 4). The nomenclature "3-3" signifies three points of connection on the base and three on the movable platform, while "6-3" signifies six points of connection on the base and three on the movable platform.

The Stewart-type parallel mechanisms are defined as those platforms whose six legs meet pair-wise in three points in at least one platform. In other words, the 3-3 and the 6-3 platforms are Stewart platforms. In a so-called 3-3 Stewart platform, there are three connecting points on the base and the three connecting points on the movable platform, with two legs intersecting in each connecting point. Each pair of legs in a 3-3 Stewart platform must be joined by a pair of concentric ball and socket or other type of universal joint which accommodate the endpoints of two legs, a difficult and complicated arrangement which produces unwanted interference between moving parts.

To avoid complications at the joints, it would be desirable to increase the number of connecting points, as is accomplished in the 6-3 platform. The 6-3 platform has six connecting points on the base and three connecting points on the movable platform with join the endpoints of two legs. So, even though the 3-3 platform is geometrically the simplest, it is more desirable from a design point of view to use a 6-3 platform to eliminate three of the six coincident (double) connecting points.

Although drastically increasing the geometrical complexities, designers have extended the Stewart platform by developing 6-6 platforms to completely eliminate the need for coincident connection points. In a 6-6 platform, six connecting points are on both the base and the movable platforms, so that each leg is attached at a distinct point on the base and a distinct point on the movable platform, and no connecting points joint multiple legs. Current industry practice is to choose these six point to be co-planar in each of the platforms such that they form hexagons in each platform. This 6-6 configuration has completely eliminated the need for legs to share connecting points and is now the most widely employed type of device in the flight simulation industry. This industry standard 6-6 platform with hexagonal platforms is referred to here as a "general 6-6," and it is not considered to be a Stewart-type platform because it is much more geometrically complicated.

Much of the research in the literature has devoted extensive effort to the known reverse displacement analysis that is inherently simple for parallel mechanisms (namely, it is required to compute a set of leg lengths given a desired location of the movable platform relative to the base). Thus, the reverse displacement analysis problem statement reads: given a set of vectors expressing the position and orientation of the movable platform, determine the six leg lengths. Thus, this problem is easily solved and applicable to the Stewart-type platforms as well as the industry standard, general 6-6 platform.

Utilizing only a reverse displacement analysis in a given control law constitutes open-loop control of the position and orientation of the movable platform relative to the base. In other words, a controller only commands a desired position and orientation of the movable platform and is not updated periodically as to the actual position and orientation. Hence, the controller's further operation is contingent upon the legs reaching their commanded positions obtained from the reverse displacement analysis.

On the other hand, incorporating a forward displacement analysis "closes the loop" by providing a cartesian controller with feedback information as to the position and orientation of the movable platform. Accordingly, the forward displacement analysis depends on the calculation of the vectors expressing the actual position and orientation of the movable platform, given the actual lengths of the six legs. The forward displacement analysis is far more difficult than the reverse displacement analysis. This stems from the fact that given a set of six leg lengths (and the two platforms), there are a number of different "closures" resulting from the fact that there are a number of different solutions of the vectors representing the position and orientation of the movable platform. There are at least twenty-four real, and probably more, closures to a general 6-6 platform.

On the other hand, there are a maximum of sixteen real closures to the geometrically simpler Stewart-type platforms (i.e., both the 3-3 and 6-3 platforms). The closures are grouped pair-wise due to reflections through the base platform. For example, FIGS. 5A-5F illustrate six different closures for a 3-3 Stewart platform, all having the same leg lengths. It will be readily apparent that only the closure of FIG. 5B, which is a "convex" closure, is a realistic closure in the sense that no legs had to cross each other to arrive at that position and orientation from the configuration of, say, FIG. 1. However, the other five closures, which are "concave" closures, cannot be mathematically distinguished from the convex closure utilizing only the leg lengths. It will also be appreciated that the closures of FIGS. 5A and 5C-5F have crossed legs and are configurationally impossible, yet they represent actual solutions to the mathematical analysis.

Control by a "closed-form forward displacement analysis" greatly differs from an iterative forward displacement analysis because the computation is reduced to a single polynomial in a single variable. The degree of the polynomial is exactly the maximum number of real closures of the mechanism given the lengths of the legs. The control method is considered "closed-form" by kinematicians because the polynomial is obtained directly from known dimensions, even though the polynomial may itself be rooted in an iterative way with a single dimensional search. The Stewart-type platforms (the 3-3 and the 6-3) are characterized by a 16th degree polynomial with even-powered coefficients, while it is not yet know what degree polynomial characterizes the general 6-6; it is at least 24th degree, and most likely more.

A closed-loop controller of a Stewart-type platform or a general 6-6 platform that incorporates a closed-form forward displacement analysis will be greatly enhanced in many ways. First, the implementation will provide a computer-time repeatable and dependable process for determining position and orientation of the movable platform. Second, the implementation can be optimized to run within a parallel computing architecture such that the analysis is accomplished much faster than in the iterative way. Third, the implementation can be used to correctly distinguish closures near singularities.

It is also clear that a closed-form forward displacement analysis will yield much important information on the geometry and kinematics of a parallel mechanism. For instance, a closed-form solution for a Stewart platform will not only yield the exact number of real configurations of the movable platform relative to the base for a specified set of leg lengths, but will also quantify the effects of errors in leg lengths on the position and orientation of the movable platform. Furthermore, control with a closed-form forward displacement controller for a Stewart platform manipulator could provide a Cartesian controller (at a higher control level) with necessary feedback information, namely, the position and orientation of the movable platform relative to the base. This is especially important when the actual position and orientation cannot be directly sensed, and when the manipulator's configuration is determined solely from lengths of the connecting prismatic legs.

Additionally, in the field of force control, a closed-form forward displacement analysis would provide the necessary analytics to enhance the use of a Stewart platform as a force/torque sensor. A Stewart platform design that is based on an in-parallel structure lends itself well to static force analysis, particularly when utilizing the theory of screws. A wrench applied to the movable platform can be statically equated to the summation of forces measured along the lines of the six prismatic legs. Thus far, this particular application of the Stewart platform has depended on relatively "small" leg deflections, resulting in a "constant" configuration. However, employing a forward displacement analysis provides the analytics to monitor gross deflections of a Stewart platform and thereby permit one to consider the design of a more compliant force/torque sensor. In other words, controller programmed to effect a forward displacement analysis could generate the geometry of the lines of the six connecting prismatic legs of the Stewart platform so that the effects of finite changes in leg lengths can be related to the forces and torques (wrenches) applied to the movable platform.

Accordingly, there is a need in the art to provide a closed-form forward displacement analysis-based controller for the 3-3 and 6-3 Stewart platforms of a simpler geometry, as well as for the general 6-6 platform of a more complex geometry.

SUMMARY OF THE INVENTION

Briefly described, the present invention provides a method and apparatus that incorporate closed-form forward displacement analyses into the closed-loop Cartesian control of a general class of parallel mechanisms. In particular, 3-3 and 6-3 Steward platforms as well as a new special 6-6 platform design are controlled in this novel fashion. The inventions are suitable for use in flight simulator motion platforms, heavy object lifters, passive force/torque sensors, and other systems utilizing parallel mechanisms. In particular, the inventions are useful in application requiring real time motion control.

A motion system according to the present invention is capable of motion in six degrees of freedom and comprises a base platform providing at least three points of connection in a first plane. A movable platform provides at least three points of connection in a second plane. At least six linearly extensible support members extend from the points of connection in the base platform to the points of connection on the movable platform. Coupling means provides the support members with at least two rotational degrees of freedom at the points of connection. Closed-form forward displacement control means determines the position and orientation of the movable platform, and actuates (or senses) selective changes in the lengths of the linearly extensible members, thereby producing (or sensing) motion.

In the preferred embodiments, the points of connection at both the base platform and the movable platform are distinct, and there are six support members. For a preferred "special 6-6" embodiment disclosed herein, each of six support members has its own distinct point of connection on both platforms. For a 3-3 embodiment, however, the support members meet pairwise at the points of connection on both platforms. For a 6-3 embodiment, the support members meet pair-wise at the points of connection on only one platform.

Preferred embodiments of the present invention will be employed in a multi-control level controller in conjunction with known reverse displacement control means. By utilizing the present invention to change and/or sense the lengths of the six legs, closed-loop control of the position and orientation of the movable platform is accomplished by employing both a reverse displacement analysis and a closed-form forward displacement analysis. Commanded by a higher control level in the controller, a desired position and orientation of the movable platform is converted into a desired set of leg lengths via a reverse displacement analysis. In order to report back to the higher control level, the closed-form forward displacement control means converts an actual set of leg lengths into an actual position and orientation of the movable platform.

More particularly described, the preferred closed-form forward displacement control means comprises transducer means for acquiring the lengths of lines extending between the movable platform and the base platform. Computing means responsive to the acquired line lengths is operative for computing at least one closed-form forward displacement solution of the geometry of a polyhedron formed by the movable platform, the base platform, and the acquired line lengths. Means responsive to the closed-form forward displacement solution then determines the position and orientation of the movable platform relative to the base platform.

The preferred closed-form forward displacement solution computing means provides a plurality of closed-form forward displacement solutions. Some of the solutions correspond to impossible or discontinuous paths of travel of the movable platform. Thus, also provided is means for storing in a memory data corresponding to the historical path of travel for the movable platform. Means responsive to the stored path of travel data selects or identifies a particular one of the plurality of closed-form forward displacement solutions which corresponds to a real, continuous path of travel of the movable platform. The identified particular one of the closed-form forward displacement solutions establishes a proper angular coordinate of the movable platform relative to the base platform, and the remaining two angular coordinates are then readily determined from the one angular coordinate.

Yet still more particularly described, the computing means is operative in real time to carry out a method for solving a closed-form forward displacement computation, instead of an iterative computation. The method entails determining constants corresponding to spherical four-bar linkages associated with each apex of the base platform. Utilizing the constants, a polynomial associated with each of the spherical four-bar linkages of the base platform is determined. Three polynomial equations in three variables representing angular input/output relationships for the spherical four-bar linkages are assembled, each of the three polynomial equations being bi-quadric and containing two of the three variables. An eliminant polynomial is determined in one of the three variables such that its roots comprise all possible values of the variable which exist in all possible solution sets of the three variables for the three bi-quadric polynomials. All of the real roots of the eliminant polynomial are then computed. One of the real roots of the eliminant polynomial is then selected based on predetermined root selection criteria. Finally, the one identified real root of the eliminant is employed to compute the one angular coordinate of the movable platform relative to the base platform, and the remaining two angular coordinates are then readily determined.

The closed-form forward displacement solution described thus far is directly applicable to the class of Stewart platforms, viz, the 3-3 and the 6-3. Also discovered and disclosed herein is a new, special 6-6 parallel mechanism, whose geometry is simple enough that the same closed-form forward displacement analysis applies following a geometric reduction. The novel special 6-6 mechanism is capable of motion in six degrees of freedom, and comprises a base platform comprising at least three points defining a base plane; the three points define a first triangle. A movable platform provides at least three points defining a second plane; its three points define a second triangle. Six linearly extensible support members extend between the base platform and the movable platform. Each of the support members are actuatable for a motion-producing system or alternatively are passively-force resistant for a motion-sensing system. Each of the support members are connected from a single point on a line defined by any two of the three points in the first plane on the base platform with a point of connection distinct from any other of the support members to a corresponding single point on the second triangle, with a point of connection distinct from any other of the support members, for imparting or allowing motion of the movable platform relative to the base platform in accordance with selective changes in the lengths of the support members. At least three of the support members are connected at the apices of the first triangle and at least three of the support members are connected at the apices of the second triangle. Control means are provided for actuating (or is responsive to) selective changes in the lengths of the support members, thereby producing movement of the movable platform when the support members are actuatable or sensing movement of the movable platform when the support members are passively force-resistant.

Accordingly, it is an object of the present invention to provide an improved multi-leg platform manipulator mechanism suitable for use as a motion simulator, force and torque sensor, large cargo handler, vehicle suspension system, and the like.

It is another object of the present invention to provide an improved motion controller for parallel mechanisms such as Stewart platforms which effect control with a closed-form forward displacement analysis instead of an iterative forward displacement analysis.

It is another object of the present invention to provide a new parallel mechanism, specifically a special 6-6 platform, whose geometry is simple enough to be reduced to the simplest 3-3 Stewart platform configuration.

It is another object of the present invention to provide a special 6-6 platform manipulator having six support legs which is constructed without the possibility of interference between cointersecting connecting legs and which eliminates the design and use of concentric spherical or universal-type joints. This is accomplished in the present invention by providing each leg with its own distinct connection point on both the movable and base platforms, to obtain the benefits of simple geometry and distinct connections.

It is another object of the present invention to provide a method for carrying out a forward displacement analysis of a platform-type parallel mechanism, having either a Stewart (3-3) platform configuration or a special 6-6 configuration that is reducible to a 3-3 configuration, so as to provide a Cartesian controller with feedback data for controlling the positioning of a movable platform.

It is another object of the present invention to provide a method and apparatus for monitoring the gross deflections of a platform-type parallel mechanism utilized as a force/torque sensor, so as to determine the geometry of the line of the six connecting prismatic legs of the platform supports so that the effects of finite changes in leg lengths can be related to forces and torques applied to the movable platform.

It is another object of the present invention to provide a method and apparatus for controlling the position and orientation of the platform of a parallel mechanism by real-time computation of a closed-form forward solution to the geometry of the platform, based on the sensed lengths of linear actuators, instead of by iterative and computation-intensive numerical methods.

It is another object of the present invention to provide an improved control system for use in a closed-loop Cartesian controller for a parallel mechanism such as a Stewart-type platform or other parallel mechanism.

These and other objects, features, and advantages of the present invention may be more clearly understood and appreciated from a review of the following detailed description of the disclosed embodiment and by reference to the appended drawings and claims.

BRIEF DESCRIPTION OF THE DRAWING FIGURES

FIG. 5, consisting of FIGS. 5A-5F, illustrate six different closures for a set of given leg lengths for a 3-3 Stewart platform, for a given numerical example of the closed-form forward displacement solution.

Figure 6:
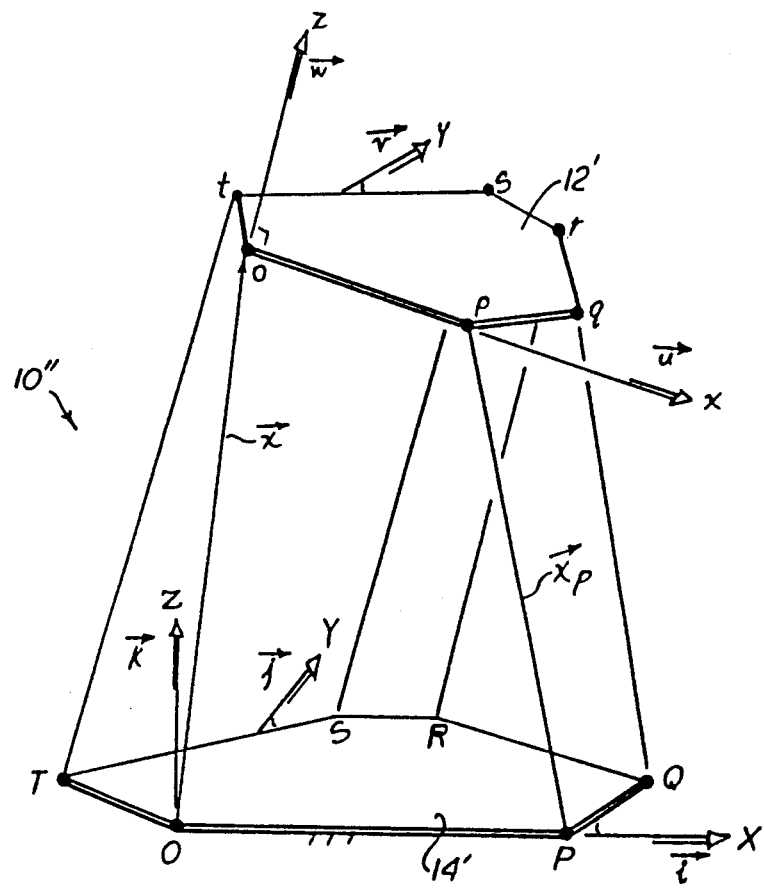

FIG. 6 is a perspective view of a general 6-6 platform having a hexagonal movable platform and a hexagonal base platform.

Figure 7:
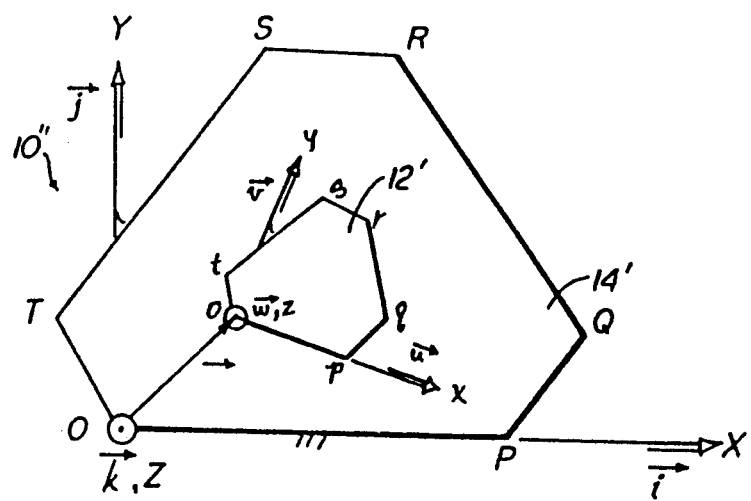

FIG. 7 is a plan view of the general 6-6 platform illustrated in FIG. 6.

FIG. 8, consisting of FIGS. 8A and 8B, compares open loop vs. closed-loop Cartesian control of parallel mechanisms, and particularly illustrates the use of the present invention in a closed-loop Cartesian controller for such parallel mechanisms.

Figure 9:
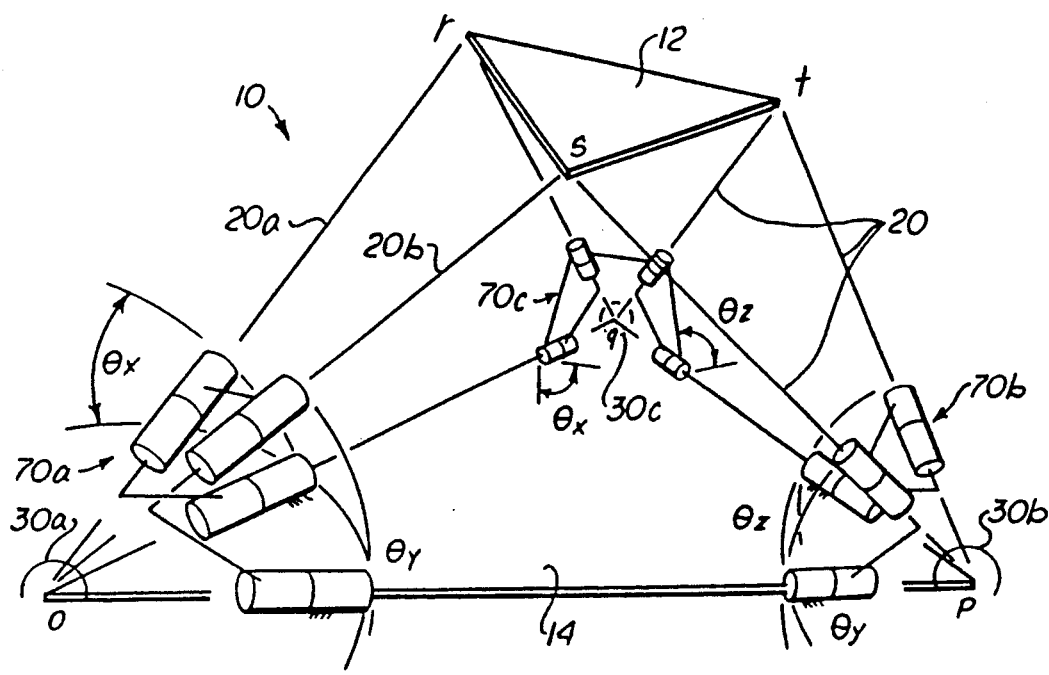

FIG. 9 schematically illustrates three spherical four-bar mechanisms utilized in solving the closed-form forward displacement method of the present invention.

Figure 10:
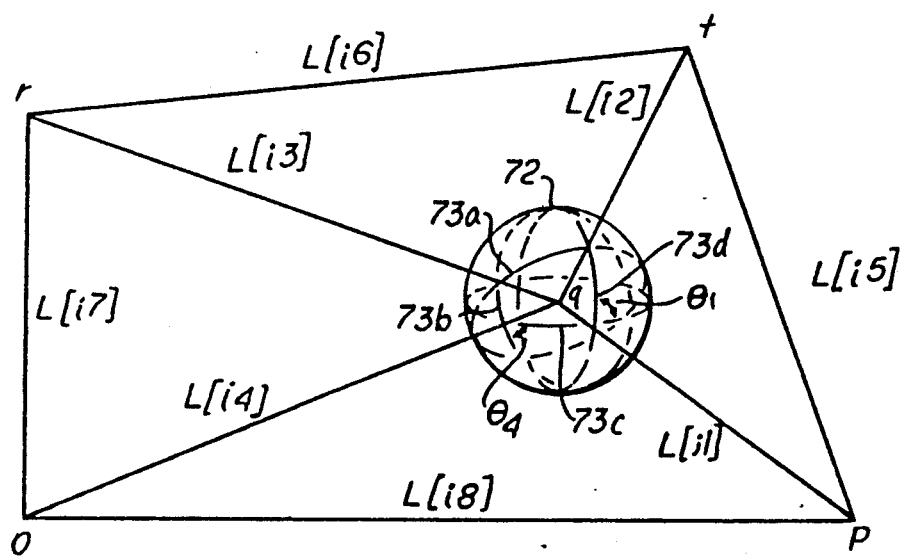

FIG. 10 illustrates in greater detail the unit sphere q utilized in FIG. 9.

Figure 11:
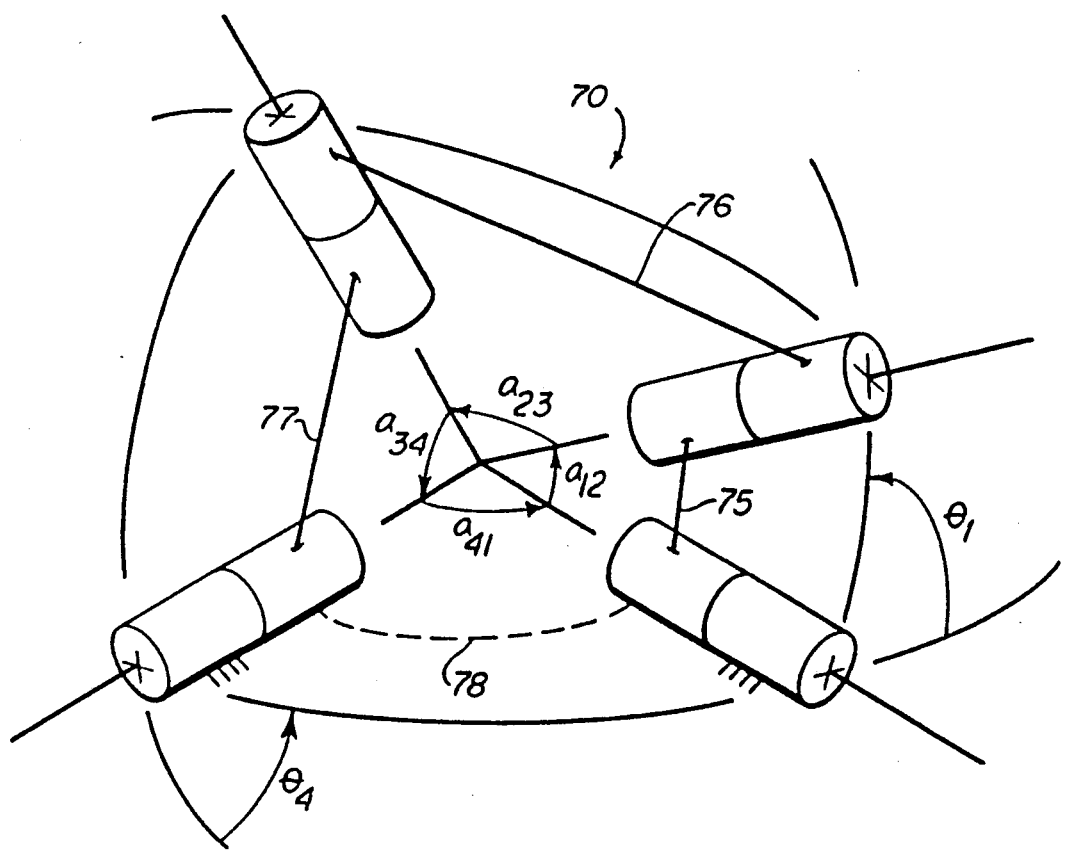

FIG. 11 schematically illustrates the coordinates and parameters of a generalized spherical four-bar mechanism such as shown in FIG. 9.

Figure 12:
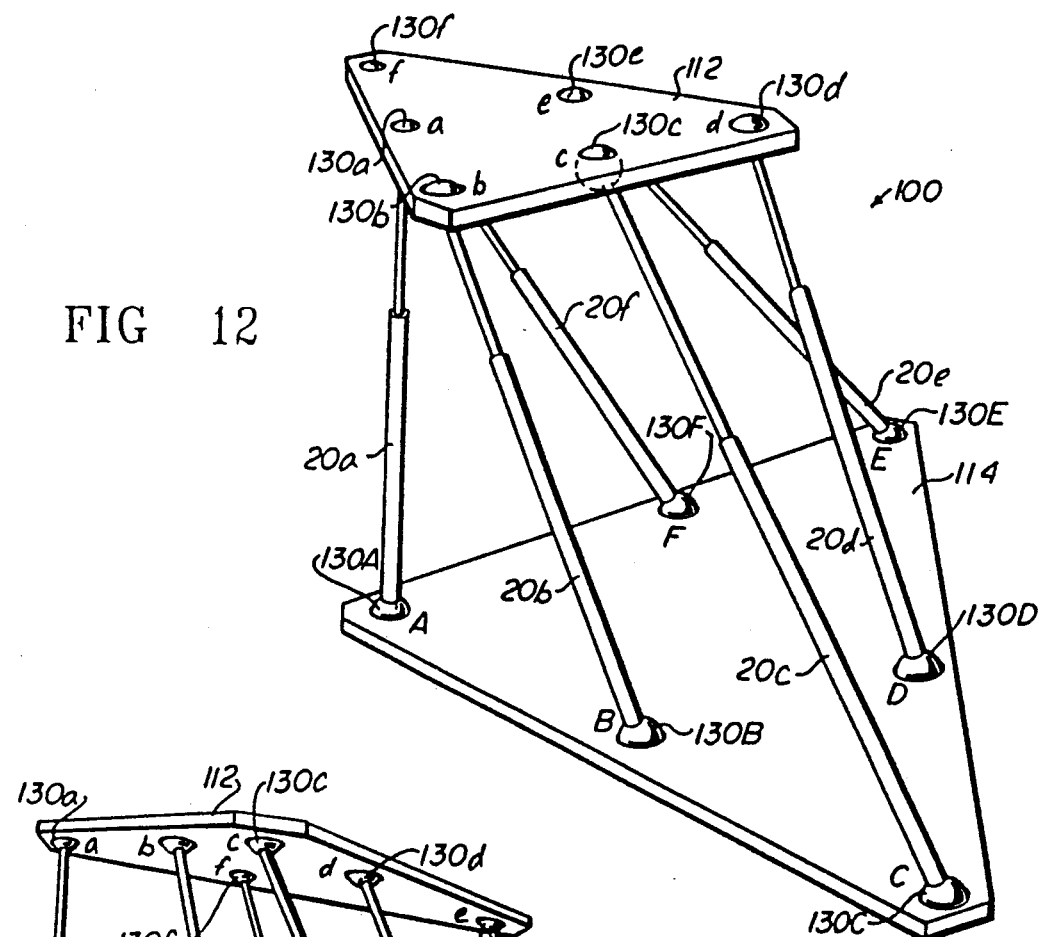

FIG. 12 illustrates the preferred embodiment of a novel special 6-6 parallel platform, midline to apex construction, constructed in accordance with the present invention.

Figure 13:
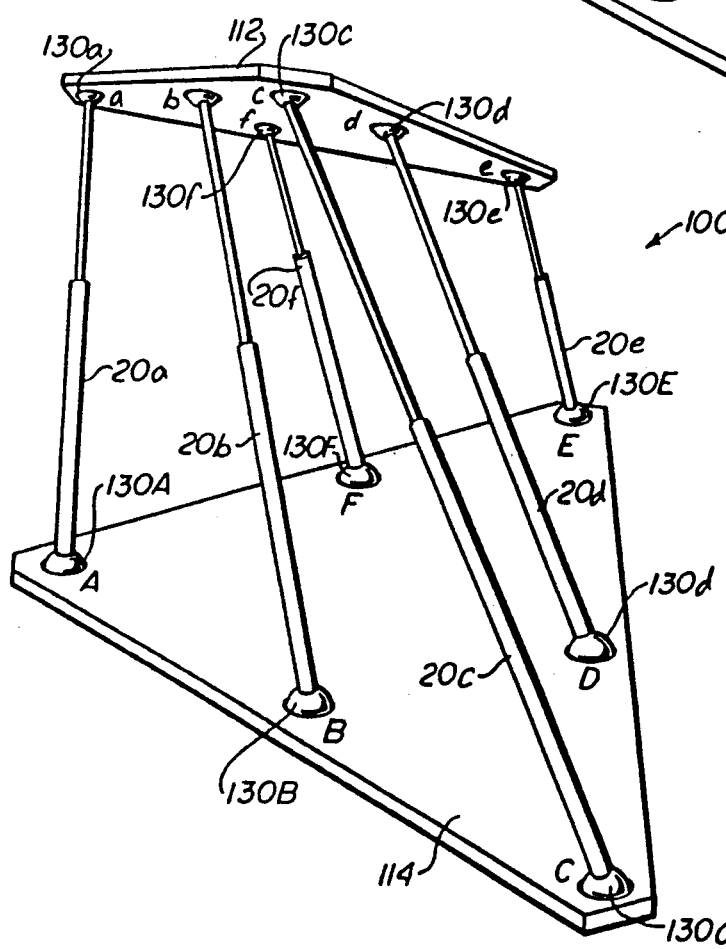

FIG. 13 illustrates a second preferred embodiment of a special 6-6 parallel platform, apex to apex construction, constructed in accordance with the present invention.

Figure 14:
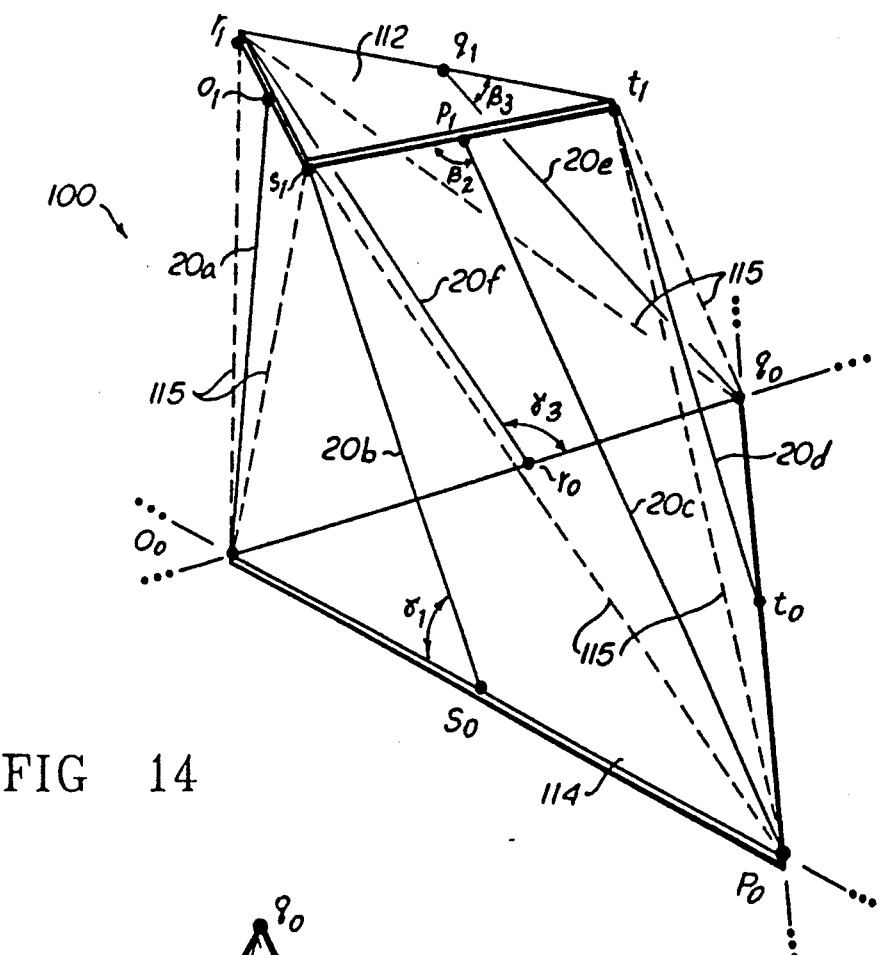

FIG. 14 is a simplified diagram of the special 6-6 platform of FIG. 11, midline to apex embodiment, for illustrating the mathematical derivation of the 3-3 virtual equivalent.

Figure 15:
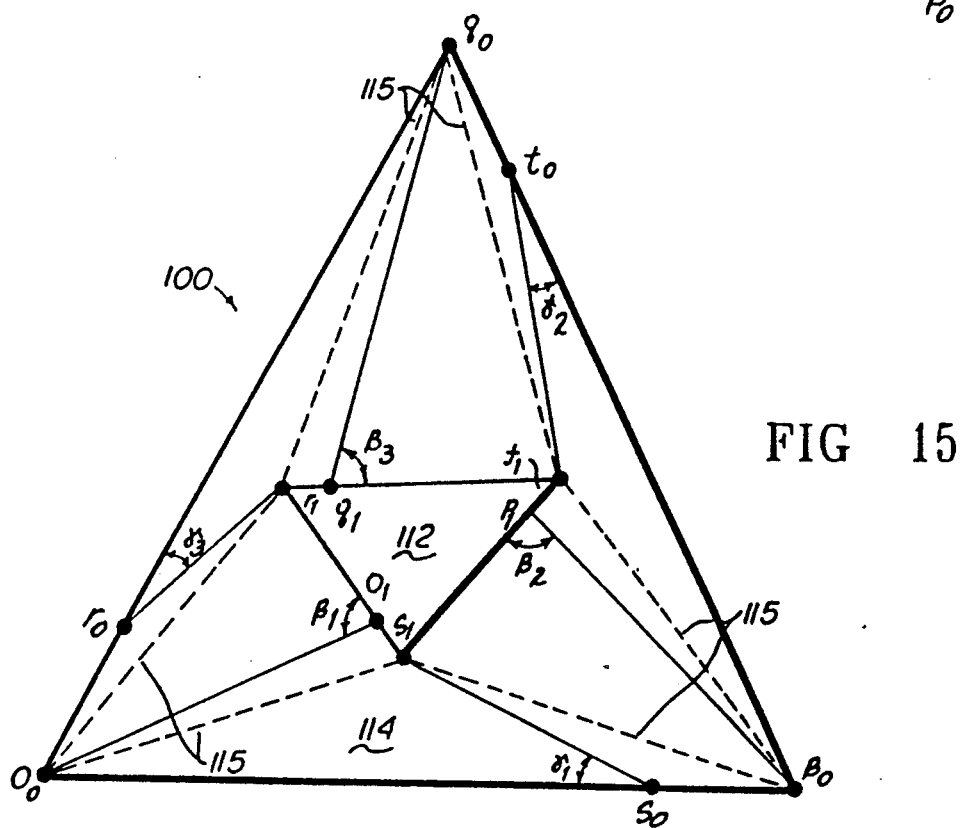

FIG. 15 is a simplified plan view of the midline to apex special 6-6 platform of FIGS. 12 and 14.

Figure 16:
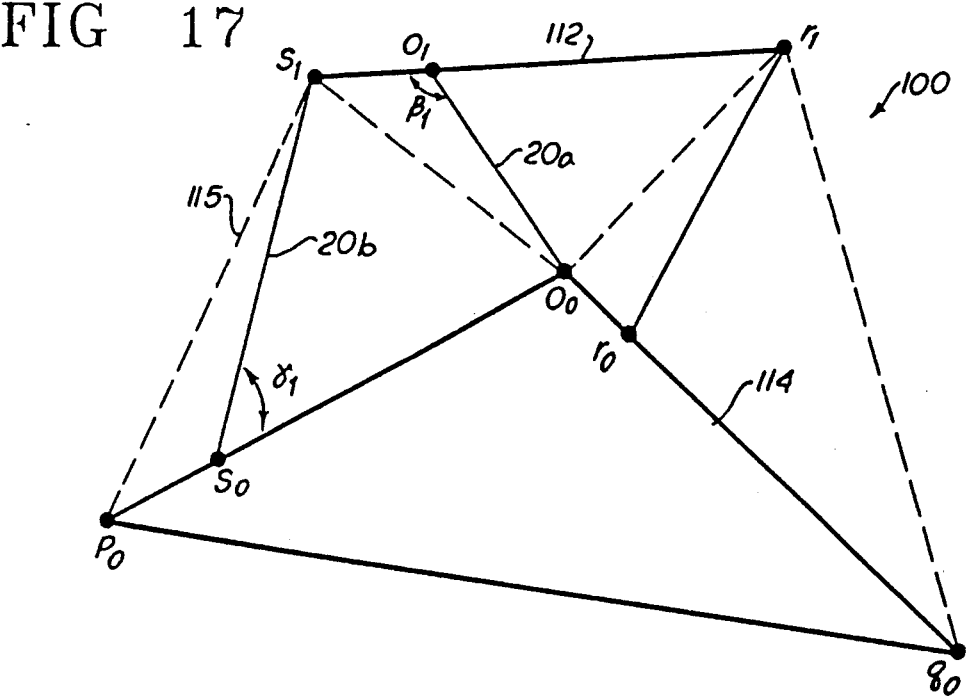

FIG. 16 is a simplified perspective view of the special 6-6 platform of FIGS. 12 and 14 illustrating the geometric relationship between certain variables utilized in reducing the special 6-6 platform to a 3-3 virtual equivalent.

Figure 17:
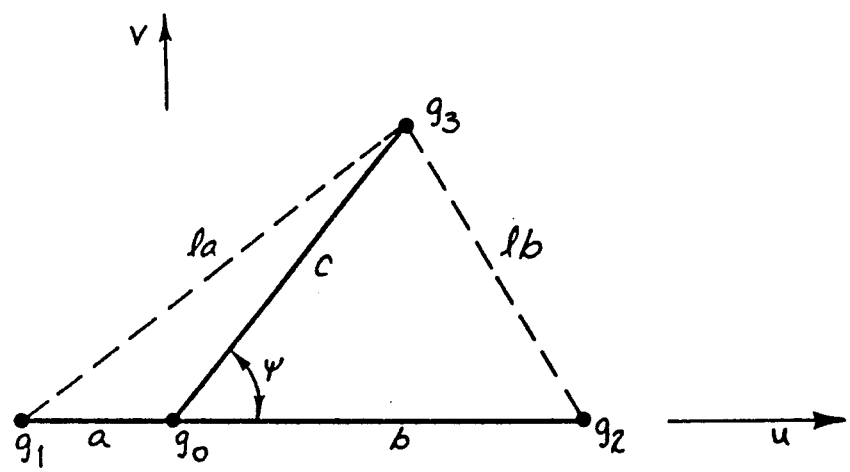

FIG. 17 diagrammatically and generally illustrates the geometric relationship between variables utilized in reducing the special 6-6 platform to a 3-3 virtual equivalent.

Figure 18:
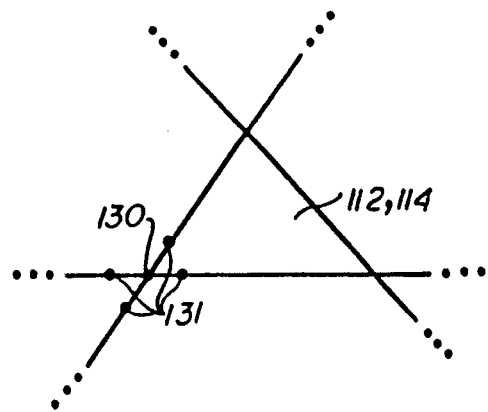

FIG. 18 illustrates the extensions to infinity of the lines forming the special 6-6 platform of FIG. 12.

Figure 19:
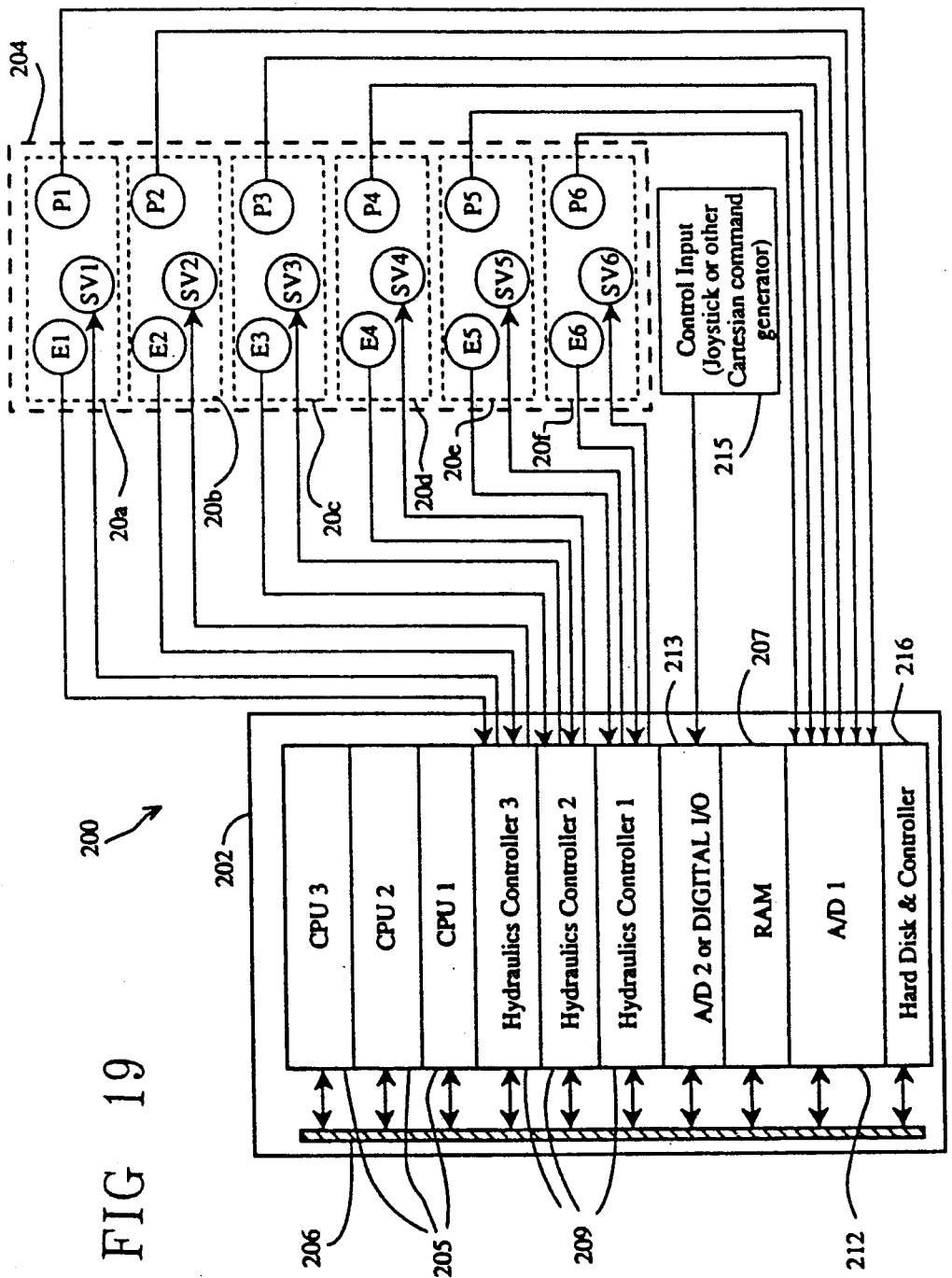

FIG. 19 is a schematic diagram of the preferred embodiment of a controller for use in the present invention.

Figure 20:
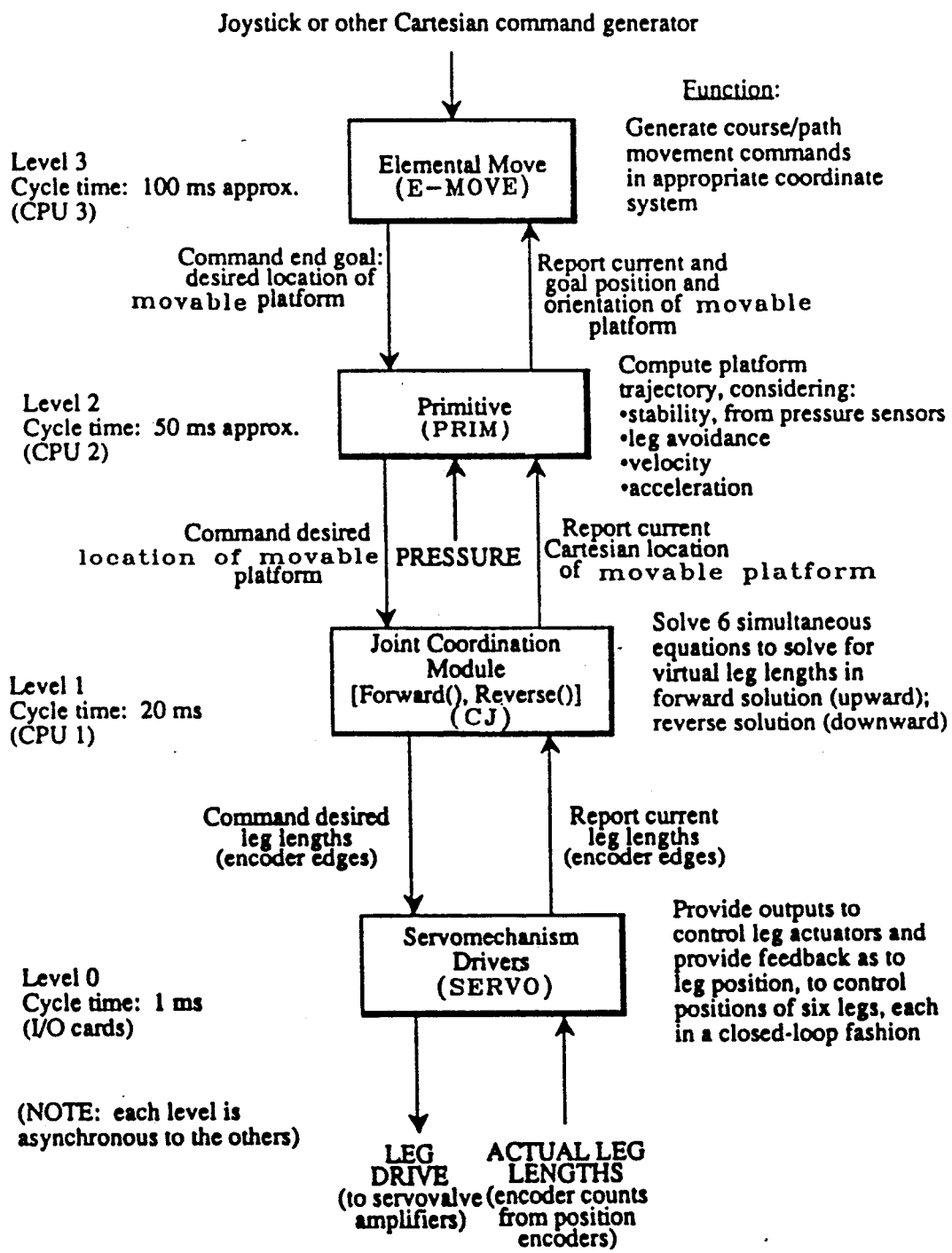

FIG. 20 schematically illustrates the preferred embodiment of the hierarchical real-time control system software which runs on the controller shown in FIG. 19.

Figure 21:
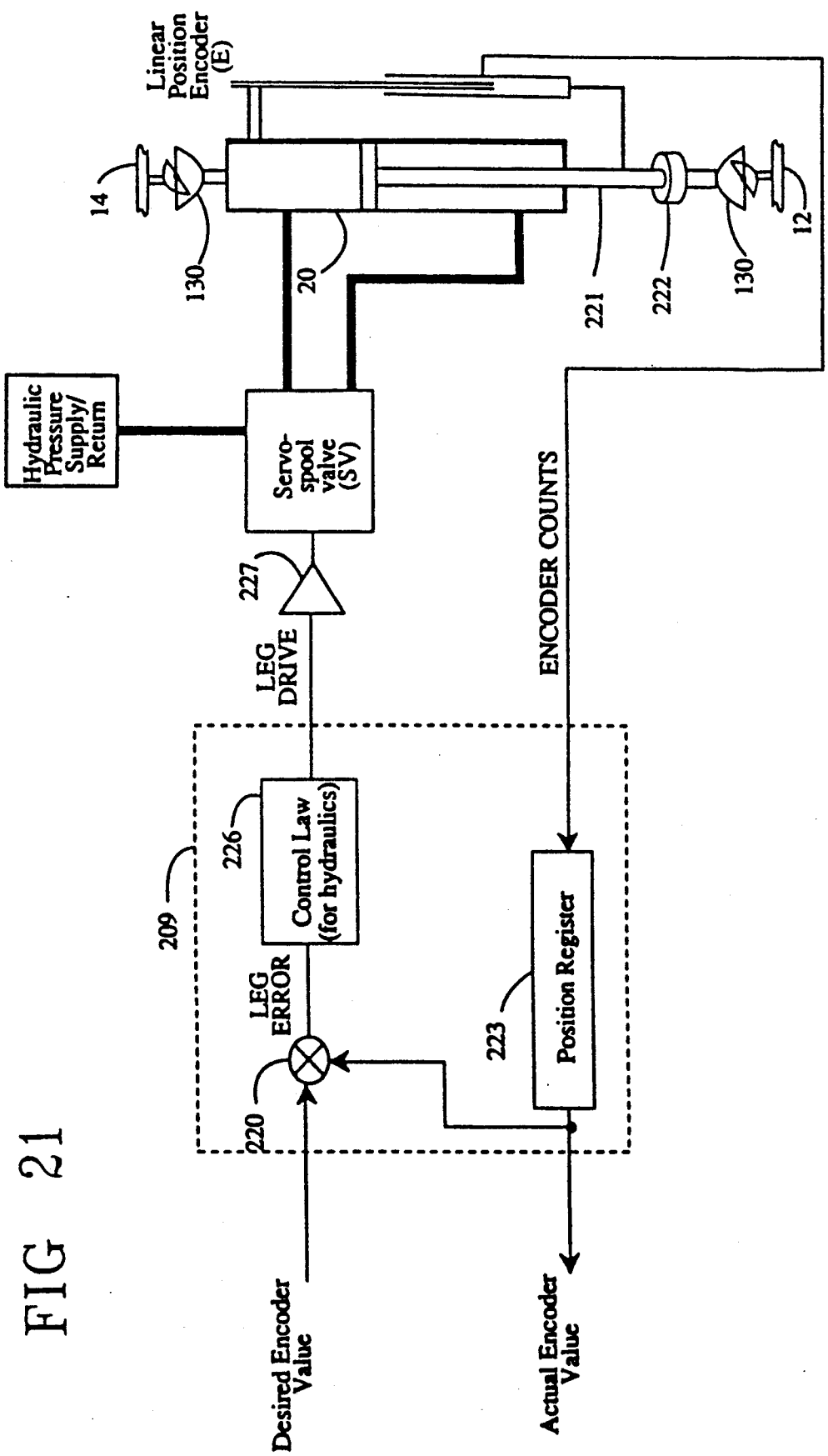

FIG. 21 is a schematic diagram of a single hydraulics controller for a single leg utilized in the controller shown in FIG. 19.

Appendix I is a pseudocode program listing of a portion of the Joint Coordination Module software of Level 1 utilized in the controller of FIG. 19 for computing the closed-form forward displacement solutions in accordance with the present invention.

Appendix II is a pseudocode program listing of other portions of the Joint Coordination Module software of Level 1 employed in the preferred embodiment for reducing the preferred special 6-6 parallel mechanism to a virtual 3-3 equivalent.

DETAILED DESCRIPTION OF THE PREFERRED EMBODIMENT

Figure 1:
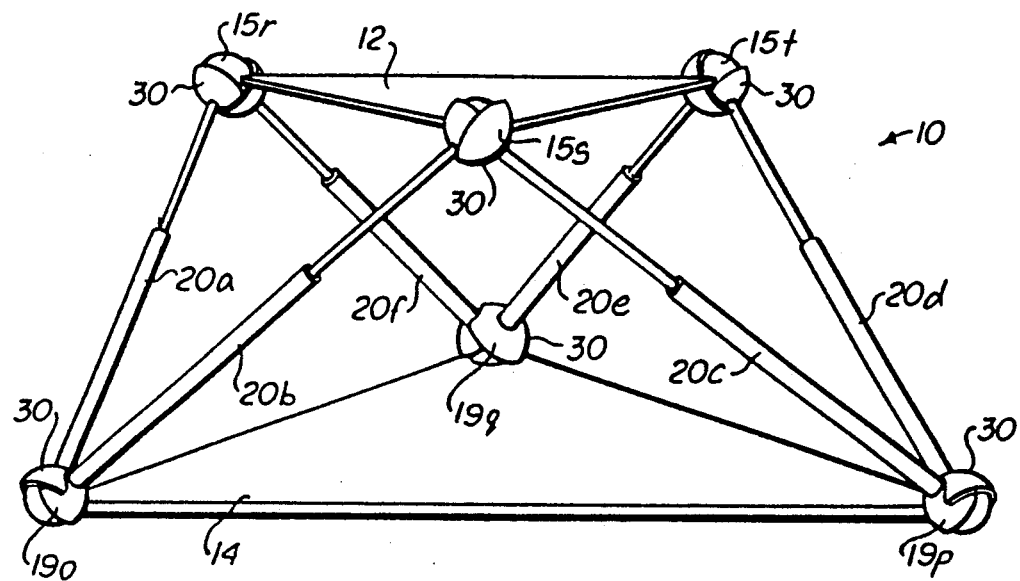
FIG. 1 illustrates a prior art 3-3 Stewart platform for which the forward displacement control method of the present invention is operative.

In order to fully appreciate the need for a closed-form solution to the control of parallel mechanisms such as a 3-3 Stewart platform or a special 6-6 platform, and to understand how such a closed-form solution controller may be made and used, it is helpful to start with the geometry of these mechanisms so as to lay a proper foundation for the subsequent mathematics. Referring now to the drawings, in which like numerals indicate like elements throughout the several views, FIG. 1 illustrates the geometry of a prior art 3-3 Stewart platform 10. The 3-3 platform 10 has a movable platform 12 and a base platform 14. The movable platform 12 provides three points 15r, 15s, 15t defining a plane, and the base 14 provides three points 19o, 19p, 19q defining another plane.

The movable platform 12 is supported above the base 14 by six powered and controlled linearly extensible prismatic joints or legs 20a–20f connecting each of the three points 19o, 19p, 19q on the base 14 with two adjacent points on the movable platform 12. In many applications, the legs 20 are hydraulic cylinders or other linear actuators. The prismatic legs 20a–20f, the points 15r, 15s, 15t of the movable platform 12, and the points 19o, 19p, 19q of the base 14 collectively define the edges and vertices of the triangular faces of an octahedron.

Each leg 20 which joins the base platform 14 to the upper platform 12 is terminated at its endpoint with a six degree-of-freedom serial chain of kinematic joints, such as the joints 30. Those skilled in the art will understand that kinematic joints comprise multiple degree of freedom mechanisms such as screw joints, revolute joints, prismatic joints, cylindric joints, spherical joints, planar pair joints, Hooke universal-type joints, and the like. Various of these types of joints are suitable for use in the present invention. Each leg 20 employed in the preferred embodiment has six independent degrees of freedom.

In many conventional 3-3 Stewart-type platforms, a spherical joint 30 is attached to each end of each of the prismatic legs 20. A spherical joint provides operation as a "universal" joint and is generally viewed as providing the most flexibility for six degrees of freedom motion. However, it should be appreciated that each of the joints 30 are double or concentric spherical joints that provide the termination for two of the legs 20, thereby complicating the mechanical design of the joint and compromising its flexibility. In other words, at each point of connection, there exists two independent spherical joints that are connected to two independently moving prismatic legs 20.

Figure 2:
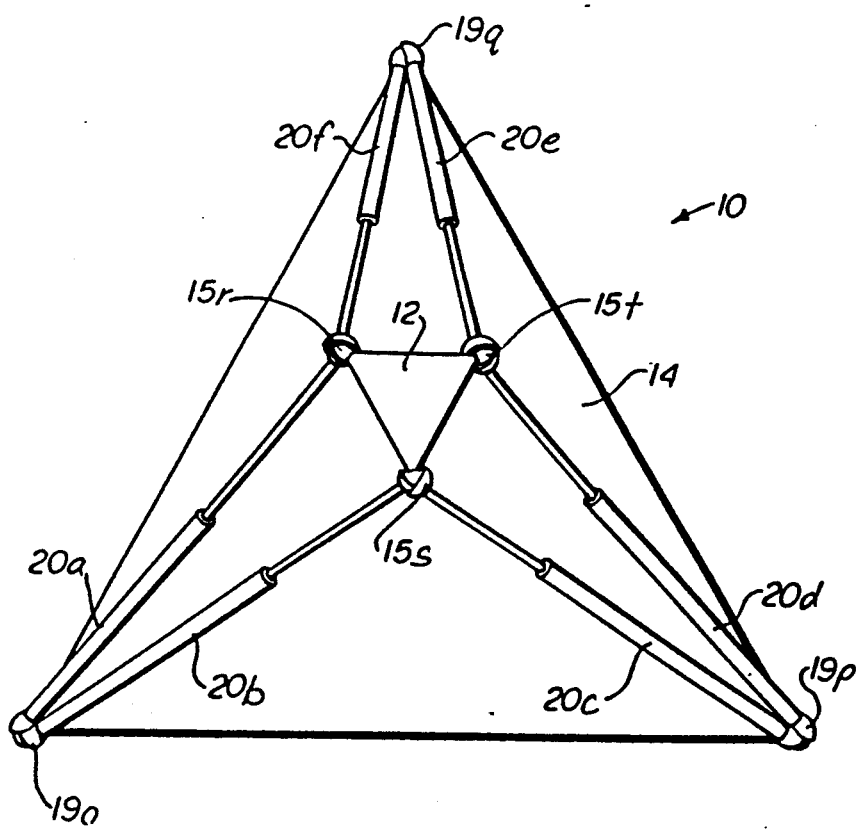
FIG. 2 is a plan view of the 3-3 Stewart platform illustrated in FIG. 1.

The octahedral configuration of the 3-3 Stewart platform 10 may be more easily seen in FIG. 2. For a closed-form forward displacement analysis, the lengths of the six prismatic legs 20 are given, together with the lengths of the edges of the upper platform 12 and base 14. In other words, all edges of the octahedron are known. To effect control by a closed-form forward displacement analysis, therefore, it is required to find all possible ways to assemble the eight triangles seen in FIG. 2, such that the edges of each triangle share the correct edges of three adjacent triangles.

Figure 3:
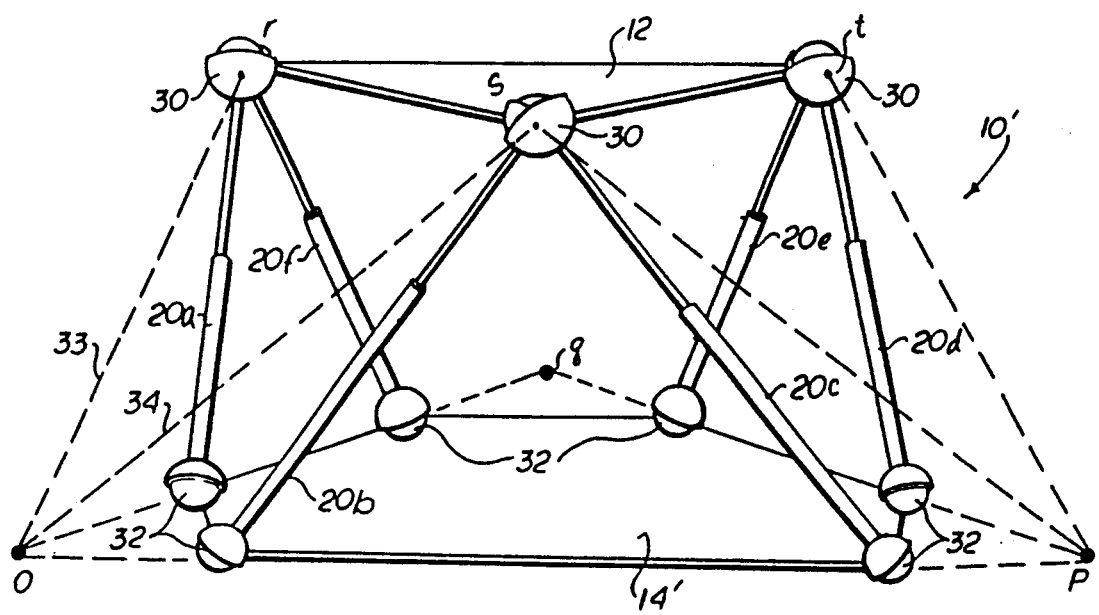
FIG. 3 illustrates a prior art 6-3 Stewart platform for which the forward displacement control method of the present invention is also operative.
Figure 4:
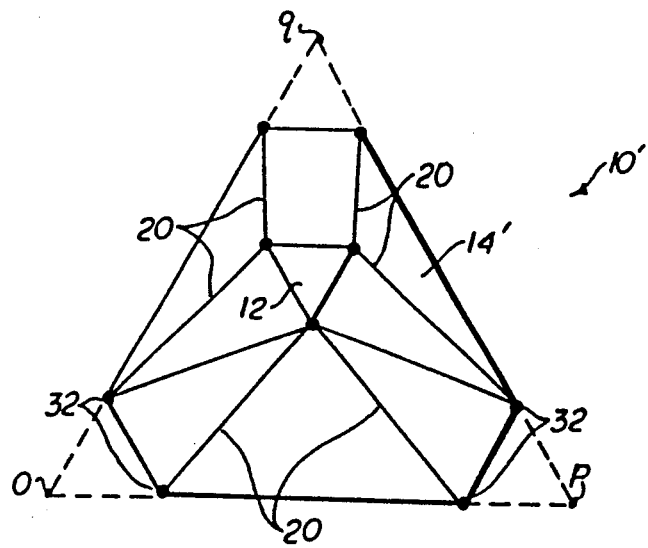
FIG. 4 is a plan view of the 6-3 Stewart platform illustrated in FIG. 3.

It is known that double or concentric spherical joints 30 present design problems by causing interference between cointersecting connecting legs. It is thus of importance to eliminate, as far as possible, the use of concentric spherical joints. In this respect, there have been efforts in the art to eliminate at least three of the six concentric spherical joints required in a 3-3 Stewart platform of FIGS. 1 and 2. Referring now in this regard to FIGS. 3 and 4, it will be seen that a 6-3 Stewart-type platform 10' comprises a triangular movable platform 12 but a hexagonal base platform 14', with only three concentric spherical joints 30. Six spherical or universal joints 32 are provided at the endpoints of the legs on the base 14', but these are not concentric (double) type and are therefore mechanically simpler. Each of the six legs 20 still terminates at a spherical joint at each end, but the spherical joints 32 on the base 14' are now separated, rather than comprising concentric spherical joints intersecting at a common connecting point on the base.

The present inventors have determined that control of such a 6-3 Stewart platform 10' may be effected by extending the mathematical solution of a 3-3 Stewart platform. This can be seen in FIGS. 3 and 4 in that a "virtual" 3-3 Stewart platform may be derived by extending the sides of the hexagonal base 14' to meet at the imaginary points o, p, and q, and by extending lines such as 33, 34 from the triangular vertices of the movable platform 12 to the imaginary points o, p, and q. It will be seen that the octahedral configuration of FIG. 1 results. Inasmuch as the distance of the vertices of the hexagonal base 14' from the imaginary points o, p, and q and from each other will be known, the geometry of the virtual 3-3 platform can be readily determined based on the known leg lengths of the 6-3, which are now the six extendible prismatic legs 20a-20f.

It should be reiterated at this juncture that the class of parallel mechanisms known as a "Stewart platform" is either 3-3 or 6-3 type of mechanism. While all Stewart platforms are parallel mechanisms, all parallel mechanisms are not Stewart platforms, for example a general 6-6 platform is not a Stewart platform. Accordingly, it will be understood that the present closed-form forward displacement control inventions are operative with Stewart platforms as well other types of parallel mechanisms, and that the present inventions are not limited to Stewart platforms.

Prior Art Open-Loop Cartesian Reverse Displacement Control

In order to gain an appreciation of the need for the closed-form forward displacement control method of the present invention, it is helpful to review the prior art reverse displacement control and iterative forward displacement control methodologies. Referring now to FIGS. 6 and 7, in the case of a general 6-6 platform 10''', the base platform 14' comprises the six points labeled O, P, Q, R, S, and T. An (i j k) coordinate system has been chosen on this platform, with the origin at O. The unit vector $\bar{i}$ denotes the X-axis, the unit vector $\bar{j}$ is the Y-axis, and the unit vector $\bar{k}$ is the Z-axis. The locations of the six points forming the base platform are known, because the points always lie in the XY plane with the point P lying on the X-axis.

The movable hexagonal platform 12' consists of the six points o, p, q, r, s, and t. A ($\bar{u}$ $\bar{v}$ $\bar{w}$) coordinate system has been chosen for this platform, with its origin at o. The unit vector $\bar{u}$ denotes the coordinate system's x-axis, and the unit vectors $\bar{v}$ and $\bar{w}$, respectively, denote this coordinate system's y- and z-axes. The locations of the six points describing the movable platform 12' are known with respect to the movable platform's coordinate system, i.e., they lie in its xy plane, with point p lying on the x-axis.

The vector $\bar{x}_o = \bar{x}$ extends from point O of the base platform 14' to point o of the upper platform 12', and consider that its value is expressed in terms of the base coordinate system. The length of the leg extending from O to o is then calculated as the magnitude of $\bar{x}$, which is $\|\bar{x}\|$.

The unit vectors $\bar{u}$, $\bar{v}$, and $\bar{w}$ are known in terms of the base coordinate system. Then, the position vectors extending along the other five legs can be calculated by relations such as for leg P-p:

$$x_p = x + [R]p - P,\qquad \text{(Equation 1)}$$

where the rotation matrix [R] is formed from the column vectors, $[R] = [\bar{u}\ \bar{v}\ \bar{w}]$. Here, the vector $\bar{p}$ locates point p in terms of the movable platform's coordinate system, while $\bar{P}$ locates point P in terms of the base coordinate system. The vector $\bar{x}_p$ is thus given in terms of the base system, and its magnitude, $\|\bar{X}_p\|$, denotes the length of the leg extending from P to p.

The lengths of the other five legs can be obtained via similar relations that depend on constant vectors, ($\bar{O}=\bar{0}$), $\bar{P}$, $\bar{Q}$, $\bar{R}$, $\bar{S}$, and $\bar{T}$, which are known in terms of the base coordinate system, and the constant vectors, ($\bar{o}=\bar{0}$), $\bar{p}$, $\bar{q}$, $\bar{r}$, $\bar{s}$, and $\bar{t}$, which are known in terms of the movable platform's coordinate system. Six equations such as Equation 1 constitute a reverse displacement representation, and determines the lengths of the six legs of the general 6-6 platform 10' as functions of $\bar{x}$ and [R]. Actually, the rotation matrix [R] can be constructed based solely on knowledge of the vectors $\bar{u}$ and $\bar{w}$, because $\bar{v} = \bar{w} \times \bar{u}$. Thus, the reverse displacement analysis problem statement reads: given $\bar{x}$, $\bar{u}$, and $\bar{w}$, determine the six leg lengths.

Open loop Cartesian reverse displacement control comprises the use of a reverse displacement analysis in conjunction with six individual leg control loops. Referring in this regard to FIG. 8A, an open loop Cartesian controller 40 comprises a reverse displacement controller 41 which receives a commanded Cartesian position and orientation of the movable platform (not illustrated) in the form of Cartesian vectors $\bar{x}_c$, $\bar{u}_c$, and $\bar{w}_c$, from a higher level controller 42. The higher level controller 42, as described in greater detail below, may be a separate control computer or a separate program for the control computer. The reverse displacement controller 41 then, based on the foregoing reverse displacement vector analysis, obtains the corresponding commanded leg lengths $l_c$, which would be themselves controlled within closed-loop leg controllers 43, one for each leg. Each leg controller 43 then controls the leg length via a driver 44 which operates according to a predetermined control law (e.g., for acceleration, slew, etc.) and receives feedback in the form of an ACTUAL LEG LENGTH signal. A LEG ERROR signal, which is the difference between the commanded leg length $l_c$ and the actual length $l_a$ as sensed by a position encoder, is generated within the leg controller 43, and used as the input to the driver 44.

While there is feedback in the form of the detected actual leg length, such feedback does not amount to true positional feedback in the sense of knowledge of the actual position and orientation of the movable platform, because of the multiple solutions to the geometry described hereinabove. Moreover, an open loop control methodology requires the higher level controller 42 to sit idle until the legs can report that they have in fact reached their commanded position. In other words, the actual Cartesian position and orientation of the movable platform is not fed back to the higher level controller 42, and hence, this methodology is referred to as "open loop Cartesian reverse displacement control."

Prior Art Iterative Forward Displacement Control

As shown in FIG. 8B, a closed-loop Cartesian controller 50 would further include a forward displacement controller 51, which is responsive to the actual leg lengths $l_a$ to provide true positional feedback to the higher level controller 42, in the form of vectors $\bar{x}_a$, $\bar{u}_a$, and $\bar{w}_a$, corresponding to the actual position and orientation of the movable platform. The forward displacement controller 50 may be of the iterative type, known in the art, or the preferred closed-form type in accordance with the present invention.

Incorporating a forward displacement analysis "closes-the-loop" by providing the higher level controller 42 in with feedback information as to the position and orientation of the movable platform. The forward displacement analysis calculates the actual values of the vectors $\bar{x}$, $\bar{u}$, and $\bar{w}$, given the actual values of the leg lengths $l_a$. A forward displacement analysis is far more complicated than a reverse displacement analysis, and this stems from the fact that for a given set of leg lengths (and the dimensions of the two platforms), there are a number of different possible closures, and hence, a number of different solutions of $\bar{x}$, $\bar{u}$, and $\bar{w}$. A closed-form solution for this problem is expressible by a single polynomial (in a single variable) whose degree denotes the maximum number of closures.

The prior art, however, suggest that the forward displacement analysis can be only done purely iteratively for all of these parallel mechanisms: the 3-3, the 6-3, the special 6-6, and the more complicated general 6-6. Accordingly, the closed-loop controller 50 in FIG. 8B carries with it all of the hazards and the drawbacks that hinder the iterative solution technique. For the purposes of illustrating the common prior art, the iterative forward displacement analysis will next be described for the general 6-6 platform of FIGS. 6 and 7.

Firstly, in using the iterative method, initial guesses of the vectors $\bar{x}$, $\bar{u}$, and $\bar{w}$ are required, after which there occurs an optimization process that minimizes the differences between an actual set of leg lengths and a guessed set.

Consider that the actual given set of leg lengths is the $6 \times 1$ vector $L_0$. For a guessed position and orientation of the upper platform, $\bar{x}$, $\bar{u}$, and $\bar{w}$, the corresponding guessed leg lengths L can be obtained by a reverse displacement analysis, $L = L(\bar{x}, \bar{u}, \bar{w})$. Then, a scalar function of the difference between the given leg lengths and the guessed leg lengths is represented by:

$$C(X=x,u,w)=\tfrac{1}{2}(L-L_0)^T(L-L_0) \quad \text{(Equation 2)}$$

where $C(\underline{X})$ represents a semi-positive scalar function and T represents the transpose operator. When the scalar function vanishes, then one solution to the forward displacement analysis is obtained. In other words, when the Equation 2 is minimized, i.e., $C(\underline{X}=\underline{X}^*)=0$ because $\underline{L}=\underline{L}_0$, the forward displacement analysis is solved by an optimization process.

The minimization is typically done in prior art controllers with a first order search, which is one that depends on the first derivative of the objective function, $C(\underline{X})$. Consider that the error value $\epsilon=\underline{L}-\underline{L}_0$ and consider that the nine element vector $\underline{X}$ contains the three vectors $\bar{x},\bar{u}$, and $\bar{w}$. Then, a $6\times 9$ Jacobian [J] necessary to define a direction of steepest descent is obtained as:

$$[J] = \begin{bmatrix} \frac{\partial\epsilon_1}{\partial X_1} & \frac{\partial\epsilon_1}{\partial X_2} & \cdots & \frac{\partial\epsilon_1}{\partial X_9} \\ \frac{\partial\epsilon_2}{\partial X_1} & \frac{\partial\epsilon_2}{\partial X_2} & \cdots & \cdots \\ \cdots & \cdots & \cdots & \frac{\partial\epsilon_6}{\partial X_9} \end{bmatrix}$$

where $X_1$ is the $\bar{i}$ component of $\bar{x}$, $X_2$ is the $\bar{j}$ component of $\bar{x}$, ..., and $X_9$ is the $\bar{k}$ component of $\bar{w}$. Hence, an infinitesimal change in the solution vector, $\delta\underline{X}$, will result in an infinitesimal change in the error vector, $\delta\epsilon$, and they are related by:

$$\delta\epsilon=[J]\delta\underline{X}. \quad \text{(Equation 3)}$$

The direction of steepest decent $\nabla\underline{S}$ is the negative of the gradient (which can be obtained from differentiating (Equation 2) with respect to each component of $\underline{X}$):

$$\nabla\underline{S}=-G[J]^T\epsilon, \quad \text{(Equation 4)}$$

where G is a scalar gain that defines the optimum step magnitude. The $\nabla\underline{S}$ can be used to determine a new guess that will make $C(\underline{X})$ smaller in the optimization process:

$$X^{k+1}=X^k+\nabla\underline{S}. \quad \text{(Equation 5)}$$

In practice, the initial guess $\underline{X}^0$ of $\bar{x}$, $\bar{u}$, $\bar{w}$ is the last known location of the top or movable platform 12'. Thus, the forward displacement analysis converges to the final solution vector $\underline{X}^*$ within a finite number of steps (iterations). This minimization technique is however subject to the following equality constraints:

$$u\cdot w=0 \text{ and } u\cdot u=w\cdot w=1. \quad \text{(Equation 6)}$$

These equality constraints of Equation 6 derive from the fact that $\bar{u}\perp\bar{w}$ and they are unit vectors. Based on this iterative solution to the forward displacement analysis, it is known that the motion of the movable platform can "outrun" the algorithm that locates it. In other words, the number of iterations required to determine the position and orientation of the movable platform within an acceptable degree of accuracy is sufficiently high that practical limitations on the velocity and acceleration of the platform must be imposed by other control mechanisms, so that the platform does not attain an unknown or uncertain position.

Other numerical problems occur when [J] tends to be singular. This happens near regions where multiple closures exist, and in these regions, it is possible that the iterative forward displacement control methodology will even jump to a wrong closure, since there is no way to distinguish between closures.

Closed-Form Forward Diplacement Control for 3-3 Platform

In the present invention, a closed-form solution for the geometry of a 3-3 Stewart-type platform has been discovered, and this closed-form solution has been adapted for use in a closed-loop Cartesian controller 50 of FIG. 7B for mechanisms such as Stewart platforms and other types of parallel mechanisms. The closed-form solution will next be discussed, for a Stewart platform such as is shown in FIG. 1 whose six legs 20 meet in a pair-wise fashion at three points on the top or movable platform 12 and base platform 14. In terms of solid geometry, as discussed above, this structure is geometrically an octahedron having eight tringular faces. In terms of mechanisms, the movable platform 12 is supported by six linear actuators or legs 20 that act in-parallel. However, it should be understood that virtual lines coincident with the legs 20 in FIG. 1 can be derived for parallel mechanisms which do not utilize linear actuators but instead include angular (lever) and other types of actuators, or passive force resistant means such as shock-absorber or viscous damping devices. It will thus be understood that in some applications, only the lengths of "virtual" legs need be provided, where the virtual legs correspond to lines forming the sides of a polyhedron (octahedron, for a 3-3 Stewart platform) defined by the movable platform, base platform, and points thereinbetween.

For a forward displacement analysis, the lengths of the six prismatic joints or legs 20 in a 3-3 Stewart platform are given (or the lengths of virtual legs), together with the lengths of the edges of the movable and the base platforms. In other words, all twelve edges of the octahedron are known. It remains then to find all possible ways to assemble the eight triangles defining the octahedron, such that the edges of each triangle share the correct and corresponding edges of three adjacent triangles.

In order to solve the forward analysis problem, it is necessary to eliminate a pair of unwanted tan-half-angles from a set of three simultaneous bi-quadratic equations. It will be appreciated by those skilled in the art that sets of equations of this type appear frequently in the kinematic analysis of mechanisms, and hence it is considered that a general eliminant will provide closed-form solutions to a number of other kinematic and geometric problems. The expansion of the eliminant for the 3-3 Stewart Platform yields an eighth degree polynomial in the square of a single tan-half-angle. It has been determined that there are a maximum of 16 real assembly configurations of the 3-3 Stewart platform 10 shown in FIG. 1. Because of the reflections of the mechanism through the base platform 14, these assembly configurations are grouped pair-wise. Therefore, there are, for a given set of leg lengths, a maximum of eight reflected pairs of real solutions to this forward displacement analysis.

Turning now to FIG. 9, it may be seen that, inherently, each of the three corners of the base platform 14 of a 3-3 Stewart platform 10 comprises the equivalent of a mechanical construct known in the art as a "spherical four-bar linkage". Three spherical four-bar linkages 70a, 70b, 70c are illustrated in FIG. 9. Here, the vertices on the base platform 14 are o, p, and q, and the vertices on the upper platform 12 are r, s, and t. In other words, each of the octahedron's vertices that are in the triangular base 14, namely o, p, and q, is the center of concentric spherical joints 30a, 30b, 30c, respectively, that connect a pair of the legs 20 to the base platform. Referring in particular to the linkage 70a, four lines radiate from each of these three vertices: two are platform legs 20a, 20b, and the other two are sides of the triangular base op and oq. At each vertex, the four lines form, in a pair-wise fashion, four planes.

In FIG. 10, when a sphere 72 of unit radius is centered at a given vertex, such as the vertex q, then the four planes through the vertex cut it in four arcs of great circles 73a–73d. It should be understood that this representation with spherical four-bar equivalents is also valid when formulated from the movable platform 12, specifically using points r, s and t. These four arcs of great circles 73 form a spherical quadrilateral that is a skeletal model of a 4R spherical mechanism with mobility one.

A single, generalized spherical four-bar linkage 70 is shown in FIG. 11. The linkage 70 comprises four links: an output link 75, a coupler link 76, an input link 77, and a grounded (fixed) link 78, are denoted respectively by the angles, $\alpha_{12}$, $\alpha_{23}$, $\alpha_{34}$, and $\alpha_{41}$. For this generalized spherical four-bar linkage, the input angle is denoted by $\theta_4$, and the output angle by $\theta_1$.

Referring back to FIG. 9, it may be seen that the three spherical four-bar linkages 70a–70c may be associated with the generalized spherical four-bar linkage 70 of FIG. 11. The grounded links 78 for these spherical four-bar linkages are all attached to the base platform 14. They are, in fact, the three interior angles of the triangle that forms the base platform 14. The coupler links for these spherical four-bar linkages are angles contained in the triangles ors, pst, and qrt. The input and output links are six angles taken from the three triangles that are known to share edges with the base platform 14. These are the triangles ops, pqt, and qor.

Summarizing, it will be seen that twelve link angles are required to define these three spherical four-bar mechanisms 70a–70c in FIG. 9, as listed in Table I:

TABLE I

| Link angles that define the three spherical four-bar linkages: | | | |
|---|---|---|---|
| Origin | o | p | q |
| Output, $\alpha_{12}$ | ∠qor | ∠ops | ∠pqt |
| Coupler, $\alpha_{23}$ | ∠ros | ∠spt | ∠tqr |
| Input, $\alpha_{34}$ | ∠sop | ∠tpq | ∠rqo |
| Ground, $\alpha_{41}$ | ∠poq | ∠qpo | ∠oqp |

Next, it will be understood that the cosines of these twelve angles may obtained via the cosine law for an interior angle of a planar triangle. To adequately determine these link angles, it is necessary to account for the signs of sines of the twelve angles. Firstly, the signs of the sines of the grounded links 78 are considered as known, since the location of the points o, p, and q are known. Secondly, it will be seen that the input-output relation for the generalized spherical four-bar linkage 70 is not a function of the sine of the coupler link. This obviates the need for the signs of the sines of the coupler links.

Lastly, the signs of the sines of the pairs of input and output links are not known. This does not present a problem for a single four-bar spherical mechanism. However, adjacent input and output links of the three spherical four-bar mechanisms 70a–70c must be consistent in the signs of the sines. For instance, the sines of the angles ∠sop and ∠ops must either be both positive or both negative. The same must be true for the pairs of angles (∠tpq, ∠pqt) and (∠rqo, ∠qor). Selecting any of these eight combinations will yield identical assembly configurations.

The input angle of one spherical four-bar is precisely the output angle for its adjacent one, as may be appreciated from an inspection of FIG. 9. For instance, the input angle for the spherical four-bar linkage 70a at o is labeled $\theta_y$. This angle, which is also the output angle for the spherical four-bar linkage 70b at p, is the angular elevation of the triangle ops relative to the base platform 14. Analogously, $\theta_z$ and $\theta_x$ measure the elevations of triangles pqt and qor relative to the base platform 14. The angles $\theta_x$, $\theta_y$, and $\theta_z$ are defined as "fold angles." For the three spherical four-bar linkages 70a–70c, these fold angles can be related to $\theta_1$ and $\theta_4$ using Table II:

TABLE II

| The input and output angles for the three spherical four-bar linkages. | | | |
|---|---|---|---|
| Origin | o | p | q |
| Output, $\theta_1$ | $\theta_x$ | $\theta_y$ | $\theta_z$ |
| Input, $\theta_4$ | $\theta_y$ | $\theta_z$ | $\theta_z$ |

Given twelve edge lengths for an octahedron that defines a 3-3 Stewart platform, applications of the cosine law for interior angles of triangles determine the twelve angles that define the three spherical four-bar linkages 70a–70c. Once these three spherical mechanisms of mobility one are defined, it remains to determine all possible sets of fold angles, namely $\theta_x$, $\theta_y$ and $\theta_z$.

For each triplet of fold angles, there is a unique assembly configuration of the 3-3 Stewart platform.

It will now be understood that, in order to provide a closed-form forward displacement solution to the position and orientation of the movable platform 12 relative to the base platform 14 in a 3-3 Stewart platform, it is necessary to compute the angles $\theta_x$, $\theta_y$ and $\theta_z$. These three angles are related through the input-output relations for the three spherical four-bar linkages 70a–70c described above.

For the generalized spherical four-bar linkage 70 of FIG. 11, the relationship between the input angle ($\theta_4$) and the output angle ($\theta_1$) is dependent on the output, coupler, input, and grounded links, which are respectively, $\alpha_{12}$, $\alpha_{23}$, $\alpha_{34}$, and $\alpha_{41}$. It can be shown that this relationship can be mathematically expressed as:

$$(s_{12}c_{41}s_{34})c_4c_1 + (s_{12}s_{41}c_{34})c_1 + (s_{41}s_{34}c_{12})c_4 \\ -(s_{12}s_{34})s_4s_1 + c_{23} - c_{12}c_{41}c_{34} = 0, \quad \text{(Equation 7)}$$

where $s_{12} = \sin(\alpha_{12})$, ..., $c_4 = \cos(\theta_4)$. This input-output relationship does not contain the sine of the coupler link, $\alpha_{23}$.

It is convenient to introduce the tan-half-angle relationships for $\theta_4$ and $\theta_1$:

$$c_j = \frac{1 - w_j^2}{1 + w_j^2} \text{ and } s_j = \frac{2w_j}{1 + w_j^2}, \quad \text{(Equation 8)}$$

where $w_j = \tan \frac{\theta_j}{2}$ for $j = 1$ and $4$.

Equation 7 then assumes the form:

$$Aw_1^2 w_4^2 + Bw_1^2 + Cw_4^2 + Dw_1 w_4 + E = 0, \quad \text{(Equation 9)}$$

where the five coefficients for a single input-output relation are:

$A = s_{12}c_{41}s_{34} - s_{12}s_{41}c_{34} - s_{41}s_{34}c_{12} + c_{23} - c_{12}c_{41}c_{34}$ $B = -s_{12}c_{41}s_{34} - s_{12}s_{41}c_{34} + s_{41}s_{34}c_{12} + c_{23} - c_{12}c_{41}c_{34}$ $C = -s_{12}c_{41}s_{34} + s_{12}s_{41}c_{34} - s_{41}s_{34}c_{12} + c_{23} - c_{12}c_{41}c_{34}$ $D = -4s_{12}s_{34}$ $E = s_{12}c_{41}s_{34} + s_{12}s_{41}c_{34} + s_{41}s_{34}c_{12} + c_{23} - c_{12}c_{41}c_{34}$

By an exchange of variables, Equation 9 can be used to obtain the input-output equations for the three spherical four-bars 70a–70c on the base platform 14. Using the "o" columns of Tables I and II, Equation 9 can be expressed in the form:

$$A_1 x^2 y^2 + B_1 x^2 + C_1 y^2 + D_1 xy + E_1 = 0. \quad \text{(Equation 10)}$$

Here, the five coefficients $A_1, \ldots, E_1$ where $\alpha_{12}, \ldots, \alpha_{41}$ are given by $\angle qor, \ldots, \angle poq$ in the "o" column of Table I. Also, from the "o" column of Table II, the relations $x = \tan(\theta_x/2)$ and $y = \tan(\theta_y/2)$ replace $w_1$ and $w_4$. Analogously, the following two equations are obtained by respectively using the "q" and "p" columns of Tables I and II.

$$A_2 z^2 x^2 + B_2 z^2 + C_2 x^2 + D_2 zx + E_2 = 0 \quad \text{(Equation 11)}$$

$$A_3 y^2 z^2 + B_3 y^2 + C_3 z^2 + D_3 yz + E_3 = 0 \quad \text{(Equation 12)}$$

Now, the coefficients $A_2, \ldots, E_2$ and $A_3, \ldots, E_3$ replace $A, \ldots, E$ of Equation 9, and a third tan-half-angle relation $z = \tan(\theta_z/2)$ is introduced.

When all edges of the octahedron are equal, then all of the triangular faces are equilateral, and all four links of each spherical four-bar mechanism 70a–70c are 60°. Equations 10, 11, and 12 then reduce to $xy = zx = yz = \frac{1}{2}$. This yields the unique solution $\theta_x = \theta_y = \theta_z = 70.53°$ for the regular octahedron, which is one of the Platonic solids.

For the general 3-3 case, it remains to eliminate y and z from Equations 10, 11, and 12 and obtain a polynomial in x. It is convenient to rewrite Equations 10 and 11 in a condensed form:

$$a_1 y^2 + 2b_1 y + c_1 = 0 \quad \text{(Equation 13)}$$

$$a_2 z^2 + 2b_2 z + c_2 = 0 \quad \text{(Equation 14)}$$

where $a_1 = A_1 x^2 + C_1$, $b_1 = 0.5 D_1 x$, $c_1 = B_1 x^2 + E_1$,
$a_2 = A_2 x^2 + B_2$, $b_2 = 0.5 D_2 x$, $c_2 = C_2 x^2 + E_2$.

The eliminant, $\Delta$, of Equations 12, 13, and 14, is expressed in terms of x by the polynomial:

$$\Delta = \alpha^2 - 4\beta^2 \rho_1 \rho_2, \quad \text{(Equation 15)}$$

where $\alpha = 2A_3 B_3 a_2 c_1^2 c_2 -$
$\quad 4A_3 B_3 c_1^2 b_2^2 + 2A_3 C_3 a_1 c_1 c_2^2 - 4A_3 C_3 c_2^2 b_1^2 -$
$\quad 2A_3 E_3 a_1 a_2 c_1 c_2 + 4A_3 E_3 a_1 c_1 b_2^2 + 4A_3 E_3 a_2 c_2 b_1^2 -$
$\quad 8A_3 E_3 b_1^2 b_2^2 - 2A_3 D_3 c_1 c_2 b_1 b_2 - 2B_3 C_3 a_1 a_2 c_1 c_2 +$
$\quad 4B_3 C_3 a_1 c_1 b_2^2 + 4B_3 C_3 a_2 c_2 b_1^2 - 8B_3 C_3 b_1^2 b_2^2 +$
$\quad 2B_3 E_3 a_1 a_2^2 c_1 - 4B_3 E_3 a_2^2 b_1^2 - 2B_3 D_3 a_2 c_1 b_1 b_2 +$
$\quad 2C_3 E_3 a_1^2 a_2 c_2 - 4C_3 E_3 a_1^2 b_2^2 - 2C_3 D_3 a_1 c_2 b_1 b_2 -$
$\quad 2D_3 E_3 a_1 a_2 b_1 b_2 - D_3^2 a_1 a_2 c_1 c_2 - A_3^2 c_1^2 c_2^2 -$
$\quad B_3^2 a_2^2 c_1^2 - C_3^2 a_1^2 c_2^2 - E_3^2 a_1^2 a_2^2$ $\beta = 4A_3 E_3 b_1 b_2 + A_3 D_3 c_1 c_2 + D_3 E_3 a_1 a_2 -$
$\quad 4B_3 C_3 b_1 b_2 - B_3 D_3 a_2 c_1 - C_3 D_3 a_1 c_2$ $\rho_1 = b_1^2 - a_1 c_1$ and $\rho_2 = b_2^2 - a_2 c_2$ When the eliminant $\Delta$ vanishes, Equations 12, 13, and 14 have simultaneous solutions in the variables y and z. The equation $\Delta = 0$ is an eighth degree polynomial in $x^2$. It follows that there are 16 solutions for x and a corresponding 16 pairs of solutions for y and z.

The eliminant, Equation 15, was obtained by first expressing Eqs. 13 and 14 in the forms $$y^2 = \frac{-(2b_1 y + c_1)}{a_1} \text{ and } z^2 = \frac{-(2b_2 z + c_2)}{a_2}.$$

These forms of Eqs. 13 and 14 were substituted into Eq. 12 to obtain the following bilinear expression:

$$a_3 yz + b_3 y + c_3 z + d_3 = 0, \quad \text{(Equation 16)}$$

where $a_3 = 4A_3 b_1 b_2 + D_3 a_1 a_2$, $b_3 = 2A_3 b_1 c_2 - 2B_3 a_2 b_1$, $c_3 = 2A_3 b_1 c_1 - 2C_3 a_1 b_2$, and $d_3 = A_3 c_1 c_2 + E_3 a_1 a_2 - B_3 a_2 c_1 - C_3 a_1 c_2$.

Following this, the solutions to Eqs. 11 and 12 may be expressed in the forms:

$$y = \frac{-b_1 \pm \sqrt{\rho_1}}{a_1} \text{ and } z = \frac{-b_2 \pm \sqrt{\rho_2}}{a_2}, \quad \text{(Equation 17)}$$

where $\rho_i = b_i^2 - a_i c_i$. Substituting Equation 17 into Equation 16 and rearranging yields the expression:

$$a_3 \sqrt{\rho_1} \sqrt{\rho_2} + (d_3 a_1 a_2 - c_3 a_1 b_2 - b_3 a_2 b_1 + a_3 b_1 b_2) = \quad \text{(Equation 18)}$$

-continued $$(a_3b_2 - b_3a_2)(\pm \sqrt{p_1}) + (a_3b_1 - c_3a_1)(\pm \sqrt{p_2}).$$ (Equation 19)

Squaring both sides of Equation 18, rearranging, and dividing throughout by the extraneous factors $a_1a_2$ yields the expression:

$$2\beta \sqrt{p_1} \sqrt{p_2} = \alpha,$$ (Equation 20)

where $$\alpha = 2(a_3b_3b_2c_1 + a_3c_3b_1c_2 + b_3d_3a_2b_1 + c_3d_3a_1b_2) -$$
$$(a_3^2c_1c_2 + b_3^2a_2c_1 + c_3^2a_1c_2 + d_3^2a_1a_2) - 2b_1b_2(a_3d_3 + b_3c_3)$$

and $$\beta = a_3d_3 - b_3c_3.$$

The final form of Equation 15 for $\Delta$ is obtained by squaring Equation 20, moving the resulting left-hand side to the right-hand side, and back-substituting the expressions for $a_3$, $b_3$, $c_3$, and $d_3$ given in Equation 16.

Numerical Example of Closed-Form Solution

The following is a numerical example for a given set of dimensions for the sides of the base platform 14, the movable platform 12, and set of lengths of legs 20 for the coordinate system of FIG. 9. The sixteen solutions for the eliminant $\Delta$ of Equation 15 are pair-wise reflections of eight solutions through the base platform 14. There can be 0, 4, 8, 12, or 16 real solutions. Therefore, there can be 0, 2, 4, 6, or 8 pairs of real, reflected solutions. The following numerical example illustrates twelve real solutions for the position of the movable platform 12, with six reflected through the base platform 14. The predetermined set of given edges is as follows:

| or | os | ps | pt | qt | qr | op | pq | qo | rs | st | tr |
|----|----|----|----|----|----|----|----|----|----|----|----|
| 17.8 | 19.8 | 18 | 18 | 17 | 14.9 | 12 | 12 | 12 | 6 | 6 | 6 |

Only the ratios are important. The base 14 and movable platform 12 are equilateral triangles (which is not a requirement), but the leg lengths produce no further symmetry.

For this example, the following polynomial was obtained via the expansion of the eliminant of Equation 15 ($\Delta = 0$).

$$\Delta = x^{16} - 13.3\ldots x^{14} + 73.4\ldots x^{12} - 215.5\ldots x^{10}$$
$$+ 368.2\ldots x^8 - 374.1\ldots x^6 + 220.4\ldots x^4 - 69.0\ldots$$
$$\ldots x^2 + 8.8 = 0.$$ (Equation 21)

It can be determined by known numerical methods which can be effected on a computer that this polynomial has the following sixteen roots:

$$x = \pm 0.862\ldots, \pm 1.078\ldots, \pm 1.395\ldots$$
$$\pm 1.382\ldots, \pm 1.701\ldots \pm 1.922\ldots,$$
$$(0.711\ldots \pm i0.017\ldots), \text{ and } (-0.711\ldots \pm i0.017\ldots).$$

Of these sixteen roots, there are six real configurations (that is, where the values of x are positive and do not include imaginary terms). There are of course six corresponding reflections through the base 14 (because of the negative roots), but only one solution is in the form depicted in FIG. 1, that is, with convex closure. The remaining five of these six solutions produce concave polyhedra.

Figure 5A:
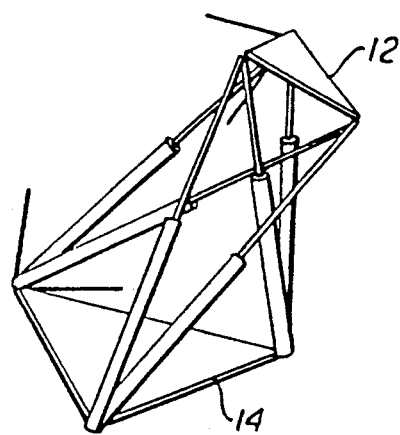
Figure 5B:
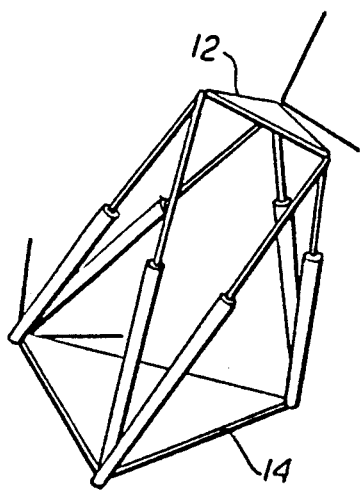
Figure 5C:
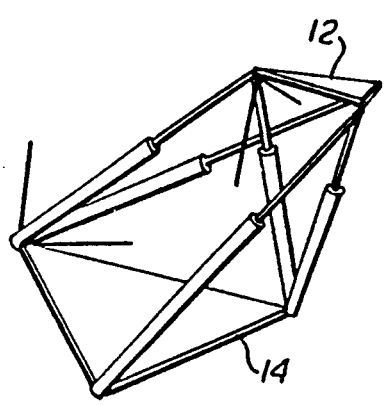
Figure 5D:
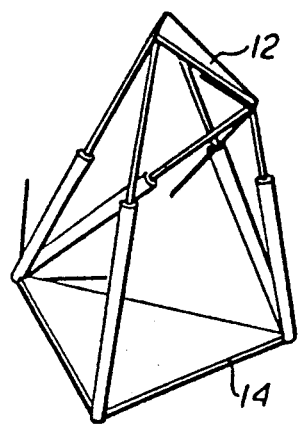
Figure 5E:
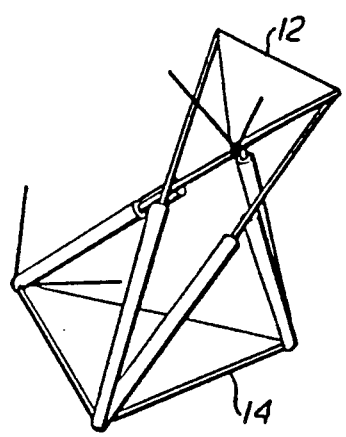
Figure 5F:
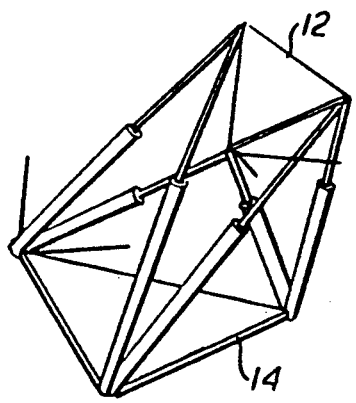

Referring in this regard now to FIGS. 5A–5F, the one convex solution is that depicted in FIG. 5B, while the other solutions produce the five concave closures of FIGS. 5A and 5C–5F. Accordingly, it will be appreciated that the solution to the closed-form forward displacement determination is that of FIG. 5B, which represents the actual position and orientation of the platform 12 given the known leg lengths.

After determination of the x root and the corresponding y and z roots, it remains to obtain their respective angles $\theta_x$, $\theta_y$, and $\theta_z$ such that the position and orientation of the movable platform can be determined. Referring in this regard now to FIG. 9, the origin of the coordinate system on the base 14 is o, the vertex p lies on the x axis, and q is in the positive x-y plane. The origin of the coordinate system for the movable platform 12 is r, the vertex s lies on the x axis, and t is in the positive x-y plane. Relative to the coordinate system on the base platform 14, the locations of the points r, s, t are listed in Table III below. In order to verify these results, a reverse displacement analysis was performed. All sixteen solutions, including the complex ones, reproduced the set of given edge and leg lengths with at least eight digits of accuracy. Furthermore, it has been verified that identical solutions were obtained, whether the signs of the sines of appropriate pairs of input and output links were taken as positive or negative.

TABLE III

The Cartesian coordinate results of the forward displacement analysis for the numerical example (only the eight upper reflections are given).

| x | y | z |
|---|---|---|
| Solution 1 | | |
| r 3.09... | 9.70... | 14.5... |
| s 8.835 | 11.2... | 13.7... |
| t 7.48... | 6.00... | 16.3... |
| Solution 2 | | |
| r 5.94... | 8.05... | 14.7... |
| s 8.835 | 3.51... | 17.3... |
| t 11.8... | 8.50... | 15.8... |
| Solution 3 | | |
| r 9.08... | 6.24... | 13.9... |
| s 8.835 | 12.1... | 12.9... |
| t 13.8... | 9.69... | 15.0... |
| Solution 4 | | |
| r 8.97... | 6.31... | 14.0... |
| s 8.835 | 1.53... | 17.6... |
| t 3.71... | 3.83... | 15.5... |
| Solution 5 | | |
| r 11.1... | 5.02... | 12.8... |
| s 8.835... | 10.3... | 14.3... |
| t 6.19... | 5.26... | 16.2... |
| Solution 6 | | |
| r 12.3... | 4.38... | 12.0... |
| s 8.835 | 5.54... | 16.8... |
| t 13.2... | 9.33... | 15.3... |
| Solution 7 | | |
| r 0.787...+i0.282... | 11.03...−i0.163... | 13.9...+i0.113... |
| s 8.835 | 11.79...+i4.01... | 14.2...−i3.33... |
| t 4.35...+i4.84... | 4.20...+i2.79... | 16.7...+i1.50... |
| Solution 8 | | |
| r 0.787...−i0.282... | 11.0...+i0.163... | 13.9...−i0.113... |
| s 8.835 | 11.7...−i4.01... | 14.2...+i3.33... |
| t 4.35...−i4.84... | 4.20...−i2.79... | 16.7...−i1.50... |

Extension of Closed-Form Forward Displacement Control to 6-6 Platform and Other Geometries Through geometric construction, that is, reduction of a given geometric structure to an equivalent solvable structure, the foregoing closed-form forward displacement position determining methodology is directly applicable to many other parallel mechanisms. For example, when the concentric spherical joints on the base of a 3-3 Stewart platform are separated but kept in the same plane, the 6-3 Stewart Platform 10' of FIG. 3 is obtained. The same forward displacement analysis described herein applies to this 6-3 arrangement. Stewart originally proposed a 6-3 arrangement, describing it to be under "linear coordinate control."

Referring in this regard back to FIG. 3, a 6-3 Stewart platform can be modeled as a 3-3 platform by extending the sides of the hexagonal base 14' as shown in FIG. 3. The lengths of the edges of the upper platform 12, the locations of points o, p, and q, and the lengths of the six connecting prismatic joints 20a–20f are known. Then, six "virtual" connecting leg lengths, namely or, os, ps, pt, qt, and qr, can be uniquely calculated, creating a "virtual" 3-3 Stewart platform. Therefore, this 6-3 Stewart platform 10' is geometrically similar to the 3-3 version. Furthermore, three pairs of concentric spherical joints 30 on the base platform 14 of the 3-3 Stewart platform 10 of FIG. 1 have been separated and replaced with the six distinct joints 32 in FIG. 3, without increasing the complexity of the mechanism.

It will now be understood that still further reductions in mechanical complexity can be obtained while still maintaining the ability to compute a closed-form forward displacement solution and control the position and orientation. In this regard, refer now to FIGS. 12 and 13. These figures shown special 6-6 parallel mechanisms 100 and 100' constructed in accordance with the present invention. Before discussing these mechanisms, and the methodology for control thereof, it should be understood that these devices 100, 100' are parallel mechanisms not considered to be "Stewart" platforms, although they bear some visual resemblance because of the triangular base 114 and movable upper platform 112.

The distinguishing feature of the special 6-6 platforms 100, 100', which sets them apart from the general 6-6 platform is that the same closed-form forward displacement analysis for a Stewart platform is applicable following a geometric reduction. (It will be recalled from the preceding discussion that a general 6-6 platform is geometrically far more complicated than a Stewart-type platform, viz, the 3-3 and 6-3 configurations. Therefore, a closed-form forward displacement solution for the general 6-6 platform would be far more complicated, and for this reason, this is not pursued here.)

Elimination of the pairing of concentric spherical joints 30 on both the upper platform 12 and the base platform 14 of the 3-3 Stewart platform, illustrated in FIG. 1, and substitution with separated, distinct points of connection with spherical or universal joints 130, produces the special 6-6 platform 100 of FIG. 12. There are six distinct connecting points 130a–130f on the upper platform 112 of the special 6-6 platform 100, and there are also six connecting points 130A–130F on the base platform 114. Each of the six connecting points 130a–130f on the upper platform 112 lie in a plane, as do the six connecting points 130A–130F on the base platform 114. The arrangement of the connecting points on the upper platform 112 is such that such that three connecting points 130b, 130d, 130f at the apices of the platform 112 define a triangle and the three remaining connecting points 130a, 130c, 130e lie anywhere on the sides of this triangle.

As will be more fully discussed below, it should be kept in mind that the three distinct connecting points 130a, 130c, 130e which are not on the apices can lie anywhere along an infinite line extended between the apices of the platforms 112, 114 as shown in FIG. 18. In FIG. 18, as long as one of the distinct connecting points lies at the vertex 130 of the platforms 112, 114, the remaining distinct points of connection may lie anywhere along the lines extended between and beyond the vertices, for example, the alternative points 131, and the control methodology of the present invention will still be operative.

Referring still now to FIG. 12, the same arrangement of the connecting points exists on the base platform 114, with the distinct connecting points 130A, 130C, 130E forming a triangle and remaining distinct connecting points 130B, 130D, 130F lying on the sides of this triangle.

As in the 3-3 Stewart platform 10 illustrated in FIG. 1 and the 6-3 Stewart platform 10' illustrated in FIG. 3, the special 6-6 platform 100 has six legs 20a–20f of identical construction. As in the case of the Stewart platform, these legs 20 can either be actively extendible or passively resistant, depending upon the application.

In the preferred embodiments of the present invention of a special 6-6 platform, there are two possible configurations of the legs 20. In one configuration 100, illustrated in FIG. 12 (and in simplified forms in FIGS. 14 and 15), the legs 20a–20f are arranged such that each leg is attached to a corner connecting point and thence to the midline of the opposing platform. This particular configuration is known as the "midline to apex" embodiment. In other words, connecting point A, with joint 130A at the corner or apex of the base platform 114, extends to connecting point a with joint 130a positioned along a side of the movable platform 112. Similarly, connecting point B, with joint 130B on the side or edge of the base platform 114, extends to the connecting point b with joint 130b positioned at an apex of the triangular movable platform 112.

In the second preferred configuration, known as the "apex to apex" embodiment 100', illustrated in FIG. 13, three of the legs 20a, 20c, 20e are attached to the corners or apices of the platforms 112, 114, and the three remaining legs 20b, 20d, 20f are attached to the sides or edges of the platforms.

The complications of unwanted interference between moving parts which result from each pair of legs in a 3-3 Stewart platform being joined by a pair of concentric ball and socket joints, and which also exist on one of the two platforms of a 6-3 Stewart platform, are totally eliminated by the special 6-6 platform 100 of FIGS. 12 and 13.

FIGS. 14–17 illustrate the geometric conversion of the special 6-6 platform 100 to an equivalent octahedron which allows solution and control according to the above-described the 3-3 Stewart platform methodology. (The reader is reminded that a special 6-6 platform is one that is geometrically reducible to a 3-3 Stewart platform, so that the closed-form methodology is adaptable. It should also be remembered that a general 6-6 platform does not possess these characteristics, which prevents the adaptation of this closed-form methodology.) In FIG. 14, the six leg lengths 20a-20f and the dimensions of the platforms 112, 114 are known. However, the lengths of the dashed lines 115 extending between the apices of the platforms 112, 114 are unknown. When these unknown line lengths 115, which correspond to the legs of a 3-3 Stewart platform, are obtained, they will create a "virtual" octahedron. The closed-form forward displacement analysis of the position and orientation of the 3-3 Stewart platform can then be applied to the dimensions of the virtual octahedron.

In FIG. 14, assign $o_0$, $p_0$, $q_0$ to the base triangle's vertices (that is, the base platform 114), and $r_1$, $s_1$, and $t_1$ to the movable triangle's vertices (that is, the movable platform 112). Next, assign $r_0$, $s_0$, and $t_0$ to the points that are to lie on the "sides" of the base platform 114 triangle, and $o_1$, $p_1$, and $q_1$ to the points that are to lie on the "sides" of the movable platform 112 triangle. It should be understood that by "on a side", it is meant that the points can lie anywhere on the infinitely long line containing the two vertices that define that particular side of the triangle, as in FIG. 18. In other words, $s_0$ could lie anywhere on the (infinitely long) line containing the points $o_0$ and $p_0$. The origin is $o_0$, the base vertex $p_0$ lines on the x-axis, and the other four base points are to lie in the xy plane.

For the preferred embodiments, the "side" points are preferably chosen to lie somewhere between the vertices of the platforms 112, 114, and the distance between points $o_0$ and $p_0$ denoted by $o_0p_0(=p_0o_0>0)$ is the sum of $o_0s_0$ and $s_0p_0$. In other words, for the base platform 114:

$$o_0p_0 = o_0s_0 + s_0p_0,$$

$$p_0q_0 = p_0t_0 + t_0q_0,$$

$$q_0o_0 = q_0r_0 + r_0o_0, \quad \text{(Equation 22)}$$

And similarly for the movable platform 112:

$$r_1s_1 = r_1o_1s_1,$$

$$s_1t_1 = s_1p_1 + p_1t_1,$$

$$t_1r_1 = t_1q_1 + q_1r_1, \quad \text{(Equation 23)}$$

It is necessary to keep track of the lengths $o_0p_0$, $p_0q_0$, $q_0o_0$, $r_1s_1$, $s_1t_1$, and $t_1r_1$, because they constitute six of the twelve edges of the reduced "virtual" octahedron (the reduced 3-3 platform). All of these lengths are constants, once the geometries of the movable and base platforms 112, 114 have been established.

Six legs 20a-20f are employed in the embodiment 100 of FIG. 14. A leg is chosen to connect points $o_0$ and $o_1$, which is referred to as leg $o_0o_1$. It will be understood in FIG. 14 that these legs correspond to the prismatic legs 20 for the 3-3 Stewart platform, which are actuators for imparting movement or force resistant members for passive applications. Similarly, the other five legs are, in order, $s_0s_1$, $p_0p_1$, $t_0t_1$, $q_0q_1$, and $r_0r_1$. These lengths vary as the mechanism operates because they measure the extensions of the six legs.

Thus, there are 24 known lengths—six that vary ($o_0o_1$ $s_0s_1$ $p_0p_1$ $t_0t_1$ $q_0q_1$ $r_0r_1$) and eighteen fixed lengths ($o_0p_0$ $o_0s_0$ $s_0p_0$, $p_0q_0$ $p_0t_0$ $t_0q_0$, $q_0o_0$ $q_0r_0$ $r_0o_0$, $r_1s_1$ $r_1o_1$ $o_1s_1$, $s_1t_1$ $s_1p_1$ $p_1t_1$, $t_1r_1$ $t_1q_1$ $q_1r_1$). It is helpful here to think of combinations such as $j_0j_1$ or $j_0k_0$ or $j_1k_1$ as being known, while combinations such as $j_0k_1$ are not known.

Next, consider that a "virtual" 3-3 mechanism operates simultaneously with the 6-6 mechanism of FIG. 14. This virtual 3-3 has a base platform 114 comprising vertices $o_0$, $p_0$, and $q_0$ and a movable platform 112 comprising vertices $r_1$, $s_1$, and $t_1$. All platform dimensions $o_0p_0$, $p_0q_0$, $q_0o_0$, $r_1s_1$, $s_1t_1$, and $t_1r_1$ are known, and it thus remains to determine the six virtual lengths $o_0r_1$ $o_0s_1$ $p_0s_1$ $p_0t_1$ $q_0t_1$ $q_0r_1$. These lengths are illustrated with dashed lines 115 in FIGS. 14 and 15. It has been determined that the (squares of the) virtual lengths vary linearly with the (squares of the) leg lengths of the special 6-6 platform.

The reduction of the special 6-6 to the 3-3 will be done by first introducing the beta and gamma relations. The reduction is developed such that one of the virtual leg lengths, namely $o_0r_1$, is obtained via linear substitutions which are based solely on the lengths of the six real legs 20a-20f. Once $o_0r_1$ is obtained, the next step taken is to obtain the other five virtual lengths, and the twelve lengths are assembled into an order suitable for passing to a function which computes the desired locations of points $r_1$, $s_1$, and $t_1$. This is discussed more fully below in connection with the software for the controller for the special 6-6 platform 100.

In order to visualize the beta and gamma relationships, refer now to FIG. 16. This figure is a view (partial, for simplicity) of the special 6-6 platform 100 seen by an observer standing beside the edge of the base platform 114 between the vertices $p_0$, $q_0$, looking underneath the movable platform 112 toward the opposite base vertex $o_0$. The angle gamma ($\gamma_1$) is the angle between the leg 20b at its point of attachment $s_0$ on the base platform 114 along the side $p_0$, $o_0$, and the point of attachment on the movable platform $s_1$. The angle beta ($\beta_1$) is the angle between the leg 20a at its point of attachment $o_1$ on the movable platform 112 along the side $r_1$, $s_1$ and the point of attachment on the base platform $o_0$. Two further beta and gamma relations $\gamma_2$, $\gamma_3$, $\beta_2$, $\beta_3$ follow after determination of the first beta and gamma relations, as described below.

Before detailing the beta and gamma relations, it is necessary to establish a foundation for them. Please refer in this regard to FIG. 17, which shows four points, $g_0$, $g_1$, $g_2$, and $g_3$, lying in a uv plane. Here, the object is to derive an equation that relates the lengths $1_a$ and $1_b$ (shown with dashed lines). First, consider the traingle $\Delta cb1_b$. The cosine of the included angle $\phi$ can be expressed in the form:

$$\cos \phi = \frac{b^2 + c^2 - 1_b^2}{2bc}, \quad \text{(Equation 24)}$$

which is derived from the cosine law for a planar triangle. Next, consider that the point $g_0$ has ($u_0$, $v_0$) coordinates which are $(-a, 0)$ and that the point $g_3$ has ($u_3$, $v_3$) coordinates which are $(c \cos \phi, c \sin \phi)$. Then, the distance $1_a$ between points $g_0$ and $g_3$ can be related to the coordinates by:

$$\begin{aligned} 1_a^2 &= (u_3 - u_0)^2 + (v_3 - v_0)^2 \\ &= (c \cos \phi + a)^2 + (c \sin \phi)^2 \\ &= c^2(\cos^2 \phi + \sin^2 \phi) + a^2 + 2ac\cos\phi. \end{aligned} \quad \text{(Equation 25)}$$

Substituting the $\cos \phi$ from above and simplifying yields:

$$1_a{}^2 = c^2 + a^2 + \frac{a}{b}(b^2 + c^2 - 1_b{}^2) \quad \text{(Equation 26)}$$

$$= \frac{1}{b}(b\,c^2 + b\,a^2 + a\,b^2 + a\,c^2 - a\,1_b{}^2).$$

Regrouping gives the desired (symmetric) relationship between the two lengths $1_a$ and $1_b$:

$$b1_a{}^2 + a1_b{}^2 = (a+b)c^2 + a\,b^2 + a^2 b. \quad \text{(Equation 27)}$$

A beta relation is defined as one that relates (squares of) a pair of virtual lengths that intersect at a base vertex. For instance, an equation relating the lengths $o_0 r_1$ and $o_0 s_1$ will be derived. Referring now to FIGS. 15 and 17, consider that $o_1$ of FIG. 15 replaces $g_0$ of FIG. 17. Similarly, points $s_1$, $r_1$, and $o_0$ respectively replace $g_1$, $g_2$, and $g_3$. From the figures, it should be clear that $\beta_1$ replaces $\phi$ and that the lengths $o_1 s_1$, $r_1 o_1$, and $o_0 o_1$ respectively replace the lengths a, b, and c. Finally, the lengths $o_0 s_1$ and $o_0 r_1$ respectively replace $1_a$ and $1_b$. Therefore, Equation 27 with the replaced variables gives the desired beta relation:

$$r_1 o_1 (o_0 s_1)^2 + o_1 s_1 (o_0 r_1)^2 = M_1, \quad \text{(Equation 28)}$$

where $$M_1 = ((o_1 s_1) + (r_1 o_1))(o_0 o_1)^2 + (o_1 s_1)(r_1 o_1)^2 + (o_1 s_1)^2(r_1 o_1),$$

or $$M_1 = (r_1 s_1)(o_0 o_1)^2 + (o_1 s_1)(r_1 o_1)^2 + (o_1 s_1)^2(r_1 o_1).$$

Of course, the only unknowns in the above relation are the virtual 3-3 Stewart platform lengths $o_0 r_1$ and $o_0 s_1$ in FIGS. 14 and 15. Two similar equations can be derived relating respectively $p_0 s_1$ and $p_0 t_1$, and $q_0 t_1$ and $q_0 r_1$. These two relations respectively involve $\beta_2$ and $\beta_3$, and they respectively produce the constants $M_2$ and $M_3$. The following table summarizes the beta relations based on replacement in Equation 27:

TABLE 4

Summary of the beta relations.

| $\phi$ | $g_0$ | $g_1$ | $g_2$ | $g_3$ | a | b | c | $1_a$ | $1_b$ |
|---|---|---|---|---|---|---|---|---|---|
| $\beta_1$ | $o_1$ | $s_1$ | $r_1$ | $o_0$ | $o_1 s_1$ | $r_1 o_1$ | $o_0 o_1$ | $o_0 s_1$ | $o_0 r_1$ |
| $\beta_2$ | $p_1$ | $t_1$ | $s_1$ | $p_0$ | $p_1 t_1$ | $s_1 p_1$ | $p_0 p_1$ | $p_0 t_1$ | $p_0 s_1$ |
| $\beta_3$ | $q_1$ | $r_1$ | $t_1$ | $q_0$ | $q_1 r_1$ | $t_1 q_1$ | $q_0 q_1$ | $q_0 r_1$ | $q_0 t_1$ |

A gamma relation is defined as one that relates a pair of virtual lengths that intersect at a top vertex. For instance, an equation relating the lengths $o_0 s_1$ and $p_0 s_1$ will be derived. Again refer to FIGS. 15 and 17, and consider that $s_0$ of FIG. 15 replaces $g_0$ of FIG. 17. Similarly, points $p_0$, $o_0$, and $s_1$ respectively replace $g_1$, $g_2$, and $g_3$. From the figures, it should be clear that $\gamma_1$ replaces $\phi$ and that the lengths $s_0 p_0$, $o_0 s_0$, and $s_0 s_1$ respectively replace the lengths a, b, and c. Finally, the lengths $p_0 s_1$ and $o_0 s_1$ respectively replace $1_a$ and $1_b$. Therefore, Equation 27 with the replaced variables gives the desired beta relation:

$$o_0 s_0 (p_0 s_1)^2 + s_0 p_0 (o_0 s_1)^2 = M_4, \quad \text{(Equation 29)}$$

where $$M_4 = ((s_0 p_0) + (o_0 s_0))(s_0 s_1)^2 + (s_0 p_0)(o_0 s_0)^2 + (s_0 p_0)^2 (o_0 s_0),$$

or $$M_4 = (o_0 p_0)(s_0 s_1)^2 + (s_0 p_0)(o_0 s_0)^2 + (s_0 p_0)^2(o_0 s_0).$$

Of course, the only unknowns in the above relation are the virtual 3-3 lengths $o_0 s_1$ and $p_0 s_1$. Two similar equations can be derived relating respectively $p_0 t_1$ and $q_0 t_1$, and $q_0 r_1$ and $o_0 r_1$. These final two relations respectively involve $\gamma_2$ and $\gamma_3$, and they respectively produce the constants $M_5$ and $M_6$. The following table summarizes the gamma relations based on replacement in Equation 27:

TABLE 5

Summary of the gamma relations.

| $\phi$ | $g_0$ | $g_1$ | $g_2$ | $g_3$ | a | b | c | $1_a$ | $1_b$ |
|---|---|---|---|---|---|---|---|---|---|
| $\gamma_1$ | $s_0$ | $p_0$ | $o_0$ | $s_1$ | $s_0 p_0$ | $o_0 s_0$ | $s_0 s_1$ | $p_0 s_1$ | $o_0 s_1$ |
| $\gamma_2$ | $t_0$ | $q_0$ | $p_0$ | $t_1$ | $t_0 q_0$ | $p_0 t_0$ | $t_0 t_1$ | $q_0 t_1$ | $p_0 t_1$ |
| $\gamma_3$ | $r_0$ | $o_0$ | $q_0$ | $r_1$ | $r_0 o_0$ | $q_0 r_0$ | $r_0 r_1$ | $o_0 r_1$ | $q_0 r_1$ |

The solution to obtaining the virtual lengths, $o_0 r_1$ $o_0 s_1$ $p_0 s_1$ $p_0 t_1$ $q_0 t_1$ $q_0 r_1$, is thus reduced to the solution of a system of six linear equations in the six unknowns, $(o_0 r_1)^2$, $(o_0 s_1)^2$, $(p_0 s_1)^2$, $(p_0 t_1)^2$, $(q_0 t_1)^2$, and $(q_0 r_1)^2$. Based on Tables 4 and 5, it can be shown that the system of simultaneous linear equations take the form:

(Equation 30)

$$\begin{bmatrix} o_1 s_1 & r_1 o_1 & 0 & 0 & 0 & 0 \\ 0 & 0 & p_1 t_1 & s_1 p_1 & 0 & 0 \\ 0 & 0 & 0 & 0 & q_1 r_1 & t_1 q_1 \\ 0 & s_0 p_0 & o_0 s_0 & 0 & 0 & 0 \\ 0 & 0 & 0 & t_0 q_0 & p_0 t_0 & 0 \\ q_0 r_0 & 0 & 0 & 0 & 0 & r_0 o_0 \end{bmatrix} \begin{bmatrix} (o_0 r_1)^2 \\ (o_0 s_1)^2 \\ (p_0 s_1)^2 \\ (p_0 t_1)^2 \\ (q_0 t_1)^2 \\ (q_0 r_1)^2 \end{bmatrix} = \begin{bmatrix} M_1 \\ M_2 \\ M_3 \\ M_4 \\ M_5 \\ M_6 \end{bmatrix}$$

It can be shown that based on these equations that:

(Equation 31)

$$(o_0 r_1)^2 = \frac{1}{F - ABCDE} \left( \frac{M_6}{r_0 o_0} - \frac{M_3}{t_1 q_1} + C\frac{M_5}{p_0 t_0} - CE\frac{M_2}{s_1 p_1} + BCE\frac{M_4}{o_0 s_0} - BCDE\frac{M_1}{r_1 o_1} \right),$$

where $$A = \frac{o_1 s_1}{r_1 o_1}, B = \frac{p_1 t_1}{s_1 p_1}, C = \frac{q_1 r_1}{t_1 q_1},$$

$$D = \frac{s_0 p_0}{o_0 s_0}, E = \frac{t_0 q_0}{p_0 t_0}, \text{ and } F = \frac{q_0 r_0}{r_0 o_0}$$

The above A, B, C, D, E, and F are constants in the geometric reduction equations. (The constants used here, A, B, C, D, E, and F, should not be confused with the constants A, B, C, D, and E of Equation 9.) Further, the respective $M_i$ terms can be replaced with the following relations:

$$\frac{M_1}{r_1 o_1} = k_1 + m_1 (o_0 o_1)^2, \text{ where}$$ (Equations 32)

$$k_1 = (o_1 s_1)(r_1 o_1) + (o_1 s_1)^2 \text{ and } m_1 = \frac{r_1 s_1}{r_1 o_1},$$

$$\frac{M_2}{s_1 p_1} = k_2 + m_2 (p_0 p_1)^2, \text{ where}$$

$$k_2 = (p_1 t_1)(s_1 p_1) + (p_1 t_1)^2 \text{ and } m_2 = \frac{s_1 t_1}{s_1 p_1},$$

$$\frac{M_3}{t_1 q_1} = k_3 m_3 (q_0 q_1)^2, \text{ where}$$

$$k_3 = (q_1 r_1)(t_1 q_1) + (q_1 r_1)^2 \text{ and } m_3 = \frac{t_1 r_1}{t_1 q_1},$$

$$\frac{M_4}{o_0 s_0} = k_4 + m_4 (s_0 s_1)^2, \text{ where}$$

$$k_4 = (s_0 p_0)(o_0 s_0) + (s_0 p_0)^2 \text{ and } m_4 = \frac{o_0 p_0}{o_0 s_0},$$

$$\frac{M_5}{p_0 t_0} = k_5 + m_5 (t_0 t_1)^2, \text{ where}$$

$$k_5 = (t_0 q_0)(p_0 t_0) + (t_0 q_0)^2 \text{ and } m_5 = \frac{p_0 q_0}{p_0 t_0},$$

$$\frac{M_6}{r_0 o_0} = k_6 + m_6 (r_0 r_1)^2, \text{ where}$$

$$k_6 = (q_0 r_0)(r_0 o_0) + (q_0 r_0)^2 \text{ and } m_6 = \frac{q_0 o_0}{r_0 o_0},$$

It should be noted that $k_i$ and $m_i$ are constants given the geometries of the movable and base platforms. Substituting the above into Equation 31 yields the solution:

$$(o_0 r_1)^2 = K_0 30 \, K_1 (o_0 o_1)^2 + K_2 (s_0 s_1)^2 + K_3 (p_0 p_1)^2 + K_4 (t_0 t_1)^2 + K_5 (q_0 q_1)^2 + K_6 (r_0 r_1)^2,$$ (Equation 33)

where the constants $K_i$ are expressed as $$K_0 = \frac{1}{F - ABCDE} (k_6 - k_3 + C k_5 -$$ (Equations 34)

$$CE k_2 + BCE k_4 - BCDE k_1),$$

$$K_1 = \frac{-BCDE \, m_1}{F - ABCDE}, K_2 = \frac{+BCE \, m_4}{F - ABCDE},$$

$$K_3 = \frac{-CE \, m_2}{F - ABCDE}, K_4 = \frac{C \, m_5}{F - ABCDE},$$

$$K_5 = \frac{-m_3}{F - ABCDE}, K_6 = \frac{m_6}{F - ABCDE}.$$

Using Equation 30 and the constants defined in Equation 32, the squares of the other five virtual lengths can be obtained by the linear substitutions:

$$(o_0 s_1)^2 = k_1 + m_1 (o_0 o_1)^2 - A(o_0 r_1)^2$$

$$(p_0 s_1)^2 = k_4 + m_4 (s_0 s_1)^2 + D(o_0 s_1)^2$$

$$(p_0 t_1)^2 = k_2 + m_2 (p_0 p_1)^2 - B(p_0 t_1)^2$$

$$(q_0 t_1)^2 = k_5 + m_5 (t_0 t_1)^2 - E(p_0 s_1)^2$$

$$(q_0 r_1)^2 = k_3 + m_3 (q_0 q_1)^2 - C(q_0 t_1)^2.$$ (Equations 35)

With these virtual lengths, the special 6-6 platform 100 of FIG. 14 can be controlled, and the position and orientation of the movable platform 112 determined, as if the platform were a 3-3 Stewart platform. In the preferred embodiments of the present invention, this control is effected by a computer based controller, which for a 3-3 Stewart type platform, calculates a closed-form forward displacement solution, and for a special 6-6 platform or other equivalent structure, determines an effective reduction to the equivalent 3-3 Stewart platform, and then calculates the closed-form solution.

Controller for Use in the Preferred Embodiments

Turning to FIG. 19 next will be described the preferred embodiment of a controller 200 constructed in accordance with the present invention, which is suitable for implementing the closed-form forward displacement control method described hereinabove, for a 3-3 Stewart platform 10 as shown in FIG. 1, a 6-3 Stewart platform 10' as shown in FIG. 3, or a special 6-6 platform 100, 100' as illustrated in FIGS. 12 and 13. After the following discussion, it will be understood that the controller 200 is responsive to commands provided from a source external to the platform itself and to signal indicative of the lengths of the legs 20, to compute, using a closed-form forward displacement method, the Cartesian coordinates of the position and orientation of the movable platform 12 or 112 (depending upon the embodiment), and to provide these coordinates to other, higher level control devices for carrying out useful work such as flight simulation, lifting of heavy objects, force/torque sensing, and the like. Thus, the controller 200 includes means in hardware and software for implementing a closed-loop Cartesian controller 50 as shown generally in FIG. 8B.

Inasmuch as the disclosed embodiment relates to a platform suitable for use as a flight simulator or heavy object lifter, the preferred controller 200 comprises an electronic subsystem 202 operative for controlling a hydraulic actuation system 204. The preferred electronic subsystem 202 comprises a multiple-slot computer chassis which includes three central processing units ("CPU") 205, denominated CPU1, CPU2, CPU3. Each of these CPUs 205 are plugged into a common bus 206 such as the known Multibus II manufactured by Intel Corporation, or the known VMEbus. The preferred CPUs 205 are preferably high-speed single board microcomputers such as one of the model SYS68K/-CPU-30 family of 32-bit single board microcomputers, manufactured by Force Computers (Eyring Research Institute, Inc.), Provo, Utah. Those skilled in the art will understand that the CPU-30 family of single-board microcomputers is optimized for controller applications such as the present invention, and is constructed with Motorola 68030 microprocessors running at speeds on the order of 16.7-25 MHz, with several megabytes of memory. Details of the preferred CPUs 205 are available in the literature supplied by the manufacturer.

Each of the CPUs 205, CPU1, CPU2, CPU3 provides a different control function, as will be described later. In particular, the architecture of the controller 200 is such that each of the CPUs, CPU1, CPU2, CPU3, corresponds to a different control level, as set forth in the NIST Technical Note 1235 (1989) Edition) of the NA- SA/NBS Standard Reference Model for Tele-Robot Control System Architecture (NASREM) is preferred. These different control levels are discussed below in connection with FIG. 20. However, only one of the computers, CPU1, is programmed in the manner described below to determine the closed-form forward displacement solution of platform position and orientation. The other computers are employed for other, higher level functions which do not form a part of the present invention.

The multiple CPUs 205 operate asynchronously and communicate via a shared random access memory (RAM) 207 where various parameters are passed between the processors. Each of the CPUs 205 preferably runs a real-time multitasking operating system suitable for use in the Multi-bus II or VMEbus environments, for example, the known OS-9 operating system.

Also provided in the electronics subsystem 202 are three dual-cylinder hydraulics controller circuits 209, denominated Hydraulics Controller 1, Hydraulics Controller 2, Hydraulics Controller 3. These circuits 202 correspond to the leg controllers 43 of FIGS. 7A and 7B. In the preferred embodiment, each of these hydraulics controllers comprises a Creonics VMEbus Motion Control Card (MCC) circuit, manufactured by Creonics, Inc., Lebanon, NH. Details of the preferred hydraulics controller circuits 209 are provided in the literature supplied by the manufacturer. Each of the circuits 209 controls two hydraulic cylinders, and thus provides two axes of closed-loop point-to-point positioning with velocity, acceleration, and deceleration control of servovalve drive motors (SV) which power hydraulic cylinders of the legs 20.

Also included in the preferred electronic subsystem 202 is an analog/digital (A/D) converter 212 which is configured to receive analog inputs from pressure sensors P1-P6 associated with the hydraulic cylinders in the hydraulic system 204. Digitized readings of the pressure, in the signals PRESSURE, sensed within each hydraulic cylinder corresponding to a leg 20 is then available for use at higher levels in the controller.

A second A/D converter or digital I/O channel 213 is provided for receiving commands or a control input from a source 215, such as a joystick or Cartesian command generator. In particular, a joystick or other direct manual control is suitable in certain applications (for example heavy lifting), while in other applications, such as flight simulation, Cartesian commands will be provided in digital form from higher level control stages. It will be appreciated that, in flight simulator applications, a visual system mounted on the movable platform 12 will simulating movement through a simulated "virtual" multi-dimensional space by presenting images corresponding to the simulated space. Cartesian coordinates for a path of travel for the platform 12 will be generated by higher level processing stages and transformed into appropriate commands to move the platform to different positions and/or orientation so as to simulate roll, pitch, yaw, acceleration, turbulence, and the like. These commands may be provided in digital form via the digital I/O 213.

Finally, the electronic subsystem 202 further comprises a mass data storage device such as a hard disk and corresponding controller to 216, which stores appropriate software and data required by the computers 205.

The hydraulics actuation system 204 comprises actuating mechanisms such as servovalves, known to those skilled in the art, suitable for controlling the operation of the prismatic legs 20, which in the preferred embodiment are hydraulic cylinders. Thus, those skilled in the art will understand that for the 3-3, 6-3, and special 6-6 platforms described herein, there are six hydraulic cylinders 20a-20f, each of which includes a position encoder $E_n$, a servovalve and amplifier $SV_n$ and a differential pressure sensor $P_n$. It will be understood that each leg 20 is extended or retracted in response to a command provided to a corresponding hydraulics controller circuit 209, which generates appropriates signals to cause actuation of the corresponding servovalve $SV_n$, that the leg lengths are sensed by the position encoders $E_n$, and that any pressure signals needed by higher level control algorithms are then read from a corresponding pressure sensor $P_n$. Those skilled in the art will understand that there are a number of ways that encoderlike signals can be created. Resolver signals, which are less susceptible to noise, can be for instance converted into encoder signals.

In passive force-resistant applications, such as a force/torque sensor, it will be understood that the the hydraulics actuation system will not be active to move the platform. In such an application, passive force resistant elements such as viscous or hydraulic damping cylinders are substituted for the hydraulic cylinders. Forces are sensed either with the pressure sensors $P_n$, which provide signals indicative of forces applied to the platform, or by separate force transducers such as load cells provided at the distinct points of connection.

In either case, for passive force resistant applications, the forces are still provided as inputs to higher level processing functions which are not a part of the present invention. However, it will be understood that the present invention is operative in such an application to determine, by the closed-form forward displacement method, the position and orientation of the movable platform 12, deformed or displaced as a result of applied forces. The position and orientation of the movable platform 12 is then utilized by higher level functions to compute the vectors of forces applied to the movable platform. Thus, it will be appreciated that since the position and orientation of the movable platform will be known, relative to a starting position and orientation before the applied force, and the amount of force known, it is a relatively simple computation to derive force vectors.

Turning next to FIG. 20, and preparatory to describing specific software modules provided in the preferred embodiment of the present invention, it will be seen that the software architecture for the programs that execute on the CPUs 205 in FIG. 19 are provided at various levels, Level 0-Level 3. In the preferred embodiment, there are at least four levels of control.

Level 0 corresponds to the servomechanism drivers for the servovalves SV; this level is essentially a hardware level corresponding to the hydraulics controller circuits 209. These controller circuits provide LEG DRIVE signals as outputs to control the hydraulic cylinders of the legs 20. A LEG DRIVE signal actuates the servovalve (SV) for a given leg, and causes extension or retraction of the given leg. The Level 0 servomechanism drivers are of course responsive to commands to move the legs 20 to achieve a particular leg length. The LEG DRIVE signal is provided in response to such commands.

Position feedback from the linear position sensors (E) associated with the legs 20 comprises ACTUAL LEG LENGTH signals. An ACTUAL LEG LENGTH signal, derived from encoder count signals from position encoders or sensors, is indicative of a direction and amount of linear displacement for a given leg, and corresponds to the ACTUAL LEG LENGTH signal $l_a$ in FIGS. 8A and 8B. The servomechanism drivers thus determine the current leg length ACTUAL LEG LENGTH in a closed-loop fashion, based on a starting leg length modified with the encoder counts from position encoders, and provide a report of the current leg length to the Level 1 functions.

Level 1, denominated the Joint Coordination Module, corresponds in the preferred embodiment to the functions provided by CPU1. This particular computer is programmed in the manner described below in connection with Appendices I and II to solve for the coordinates, in particular the coordinates r, s, and t, of the movable platform 12, given as inputs either actual or virtual leg lengths, by carrying out a closed-form forward displacement computation.

In addition, a reverse displacement computation is carried out at Level 1 to convert the commanded Cartesian position and orientation of the movable platform provided by Level 2 into a corresponding set of commanded leg lengths to down-load to Level 0 for subsequent execution. The determination of a desired leg length is computed in accordance with the reverse displacement methodology described hereinabove, in real-time, and the LEG DRIVE signal causes movement of the leg toward the desired leg length. Thus, it will be understood that the Joint Coordination Module software for CPU1 includes a function, Reverse ( ), which is operative to effect reverse displacement control corresponding to the reverse displacement controller 41 of FIGS. 8A and 8B.

It should be clearly understood at this juncture that Level 1 also contains the software, described below in greater detail, corresponding to the forward displacement controller 51 of FIG. 8B, for solving the closed-form solution of the movable platform coordinates of a 3-3 Stewart platform, or for determining virtual leg lengths required to reduce a special 6-6 parallel mechanism such as described in connection with FIG. 12 and 13 to an equivalent 3-3 Stewart platform. This is carried out by the function Forward ( ).

Level 2 (Primitive) of FIG. 20 is carried out by CPU2 in the controller 200. Software for CPU2 is operative to compute the platform trajectory considering variables of stability from pressure sensors, leg avoidance considerations, velocity, and acceleration. Inputs to this level include the PRESSURE signal from the pressure sensors P in FIG. 19, a report of the current Cartesian coordinate location of the movable platform from the Joint Coordination Module of Level 1, and a commanded end goal from a higher level controller such as a command as to the desired location for the movable platform. Level 2 therefore determines the desired location of the movable platform and whether this desired end location is feasible, and if so provides appropriate Cartesian actuating commands to Level 1. Level 2 functions also include that of keeping track of the limits of motion for the movable platform, and positions of the platform at which legs would hit, so as to prevent generation of commands which would place the platform in an unstable configuration or a position with legs touching.

Moreover, Level 2 provides a report of the current position and orientation of the movable platform relative to a commanded end goal to a Level 3. Inasmuch as the functions of the Level 2 (Primitive) do not form a part of the present invention, further discussion of the same will not be provided herein.

Level 3 (Elemental Move) in FIG. 20 corresponds to the function provided by CPU3 of the controller 200 in FIG. 19. An Elemental Move corresponds to the generation of a course or path in an appropriate coordinate system. For example, in a flight simulation application, it is required to transform coordinates from the simulated space into a trajectory for the movable platform 12 so as to create simulation of roll, pitch, yaw, acceleration, etc. which can be experience by a person on the movable platform. Thus, it will be appreciated that the computations of a course or path for the movable platform to cause a "feel" of banking or acceleration are carried out here.

Inasmuch as the functions of Level 3 do not form a part of the present invention, further discussion of same will not be provided herein.

The preferred hydraulics controller circuit 209 comprises apparatus illustrated in FIG. 21. Although each of the preferred Creonics circuits 209 drives two hydraulic cylinders, only one will be described, it being understood that the other is identical. The LEG DRIVE signal from the Level 0 servomechanism driver described in FIG. 20 is the controller card 209 output, and the input is the desired encoder value. The desired encoder value is summed at a summer 220 with signals from a position register 223, which stores an actual encoder position indicative of the detected actual position of the leg. The position register receives ENCODER COUNT signals from a linear position encoder (E), which is physically connected to the actuator rod 221 of the hydraulic cylinder 20 comprising a leg. It will of course be understood that the cylinder 20 is physically connected via a universal joint 130 or other multiple-degree-of-freedom kinematic joint to the base platform 14, and that the end of the actuator rod 221 is similarly connected through a thrust bearing 222 and a universal joint 130 or other multiple-degree-of-freedom kinematic joint to the movable platform 12. The linear position encoder E therefore provides a signal indicative of the direction and incremental movement of the actuator rod 221 of a leg 20, which is utilized in the computations of the position and orientation of the movable platform 12 as described herein.

The actual encoder value signal stored in the position register 223 can also be read under computer control (namely, by CPU1) as the actual encoder value.

The output of the summer 220 is provided to a control law circuit 226 as a LEG ERROR signal, which is operative in the known manner to translate a command signal for actuating the hydraulic cylinder 20 into an appropriate voltage level, with appropriate ramp-up, slew, and ramp-down signal segments, suitable for provision to a servovalve (SV). The output of the control law circuit 226 is first amplified by an amplifier 227 in the known manner so as to provide appropriate drive levels for direct provision to the servovalve SV. The servovalve (SV) operates in the known manner to receive the drive signal from the amplifier 227, and connect a source of pressurized fluid from a supply 228 to the extension or retraction ports of the cylinder 20, to cause an appropriate extension or retraction in the known manner.

Closed-Form Forward Displacement Controller Software

Turning next to the Appendices I-II, the software for the controller 200, and in particular CPU1, will next be described. Appendices I-II are pseudo-code listings which illustrate the sequence of steps which is embodied as the preferred program for the CPU1, which constitutes Level 1 in the control hierarchy of FIG. 20, the Joint Coordination Module.

First of all, it should be understood that the pseudocode listing in these figures is provided in a "pseudo-C" code. Those skilled in the art will recognize that the format bears resemblance to that of the popular C programming language, and therefore it is expected to be most readily implemented using this particular programming language. However, it will also be understood that other programming languages are also suitable for use in the present invention, and that the pseudo-code listing is meant solely to enable a person skilled in the art to be able to prepare software modules or routines for execution in the controller 200, and in particular CPU1, without undue experimentation.

The pseudocode of Appendix I references the particular geometry and variable names of FIG. 9, inasmuch as the object of these particular modules is to compute a closed-form forward displacement solution for a 3-3 Stewart platform based upon the use of the four-bar linkage structure described above. Accordingly, points o, p, q correspond to the vertices of the base platform 14 and r, s, t to the vertices of the movable platform 12. The origin is point "o", point "p" lines on the x-axis, and point "q" lies in the xy plane. A distance, such as between points "o" and "p", is denoted as "op" (op=-po>0). Then, the six leg 20a–20f lengths are, in order, or, os, ps, pt, qt, and qr. The three base platform 14 lengths are, in order, op, pq, and qo, and the three movable platform 12 lengths are, in order, rs, st, and tr.

The foregoing known twelve edge lengths of the octahedron are then assembled into the following order: or os ps pt qt qr op pq qo rs st tr. This is the order of the data, in an array L, expected by all modules which are passed the array L. The pseudo-C function Octahedron ( ) is the principal software function which receives the data in the array L corresponding to the known edge lengths, and returns the values of the variables r, s, t, which are the Cartesian coordinates of the movable platform 12, indicative of its current position and orientation.

Inside the function Octahedron ( ), the geometries (the "link" lengths 75-78 and $\alpha_{ij}$'s of FIG. 11) of the three spherical four-bar linkages 70 are created, based upon the appropriate edge lengths. For a given base point, eight of the twelve edge lengths are needed to create a foursome of planar triangles that fully define the $\alpha_{ij}$'s of the spherical four-bar 70 centered at that base vertex. The respective $\alpha_{ij}$'s are then transformed into the necessary coefficients (Ai, Bi, Ci, Di, and Ei, where i=1, 2, 3), with the module Sphere4Bar ( ).

The function Sphere4Bar ( ) utilizes a generic subroutine, "coslaw ( )", to facilitate the solution of the spherical four-bar linkages. The function coslaw ( ) returns the cosine of the included angle opposite a given side. Sphere4Bar ( ) also utilizes a built-in C language function, "sqrt," to calculate the square root of particular values. The Sphere4Bar ( ) function is also passed the values of L[i1],L [i2], ... L[i8], as shown in FIG. 10, and returns the constants A, B, C, D, E of Equation 9.

Also inside the funtion Octahedron ( ), the (eight degree) polynomial in x=tan ($\theta_x$/2) is created by expanding the eliminant of Equation 15 with the function GetPoly ( ), using repeated applications of the function pmult ( ).

GetPoly ( ) expands the eliminant in terms of a polynomial in x. This is accomplished by defining polynomial arrays and generating an alpha polynomial using generically defined functions scalepoly ( ), addpoly ( ), and pmult ( ). The polynomial in x is then set equal to zero and rooted with the function poly ( ), which determines the roots of the polynomial using numerical methods known to those skilled in the programming arts. The poly ( ) function finds all possible real values for x such that the eliminant vanishes ($\Delta$=0). This has the effect of implementing one criteria for selection of a final chosen root, in that imaginary roots are discarded. When the eliminant vanishes, then the three Equations 12, 13, and 14 have common simultaneous solutions in y and z.

After rooting, the function ChooseRoot ( ) decides based on previous history of x(t) which real root is the correct one. The function ChooseRoot ( ) is operative to examine the (up to) eight real roots determined from solution of the eliminant, and to determine which of the roots corresponds to selected root indicative of the determined final position of the movable platform. The function ChooseRoot ( ) is responsive to predetermined selection criteria for eliminating all real roots except one root, which is the selected, chosen root representing the closed-form displacement computation. In the preferred embodiment, the selection criterion comprises the exclusion of solutions to x which would result in a discontinuous path of movement for the platform based on a previous history of x(t).

In the event that two or more roots fall between a predetermined tolerance of being the "chosen root," then the mechanism is certain to be passing through a singularity in its path of travel, and accordingly, the function ChooseRoot ( ) alerts the next higher control level (Level 2) immediately so that it can remedy the situation via an appropriate change in the commanded path of the movable platform. The determination of an appropriate value for the predetermined tolerance for the chosen root is a matter of selection, based upon particular circumstances of the embodiment constructed. It will be appreciated that this tolerance may be identified by placement of the platform at various known limits of desired or allowed motion, solving the equations of the geometry, and observing the numerical proximity of the roots.

In the unlikely event that no xroots are found to lie within the predetermined tolerance of being a predicted value, then the function ChooseRoot ( ) likewise alerts the Level 2 as to an error condition.

In the preferred embodiment, ChooseRoot ( ) analyzes the past history of $\theta_x$ and predicts a next value based, for example, on a quintic polynomial fit of the last five data, although other approaches may occur to those skilled in the art. The inputs are all of the real roots (xroots) and the number of real roots (nreal). The function uses the globals THETAX, KOUNT, and DELT. The function employs a first order backward difference calculation to calculate velocity and acceleration:

$$x'_k = \frac{x_k - x_{k-1}}{\Delta t} \quad \text{(Equation 36)}$$

$$x''_k = \frac{x_k - 2x_{k-1} + x_{k-2}}{(\Delta t)^2}$$

Now, consider the variable k=KOUNT to be cyclic (0 to 99), as well as x(t)=THETAX [k]. Further consider that at a given instant the algorithm is at time k, and wants to predict the value of x at time k+1. To do this, consider that a quintic polynomial is fit on the data:

$$x_{est}(t) = a_0 + a_1 t + a_2 t^2 + a_3 t^3 + a_4 t^4 + a_5 t^5. \quad \text{(Equation 37)}$$

This is done here by matching $x_k$, $x_{k-2}$, $x'_k$, $x'_{k-2}$, $x''_k$, and $x''_{k-2}$, which are denoted here by respectively $p_f$, $p_i$, $v_f$, $v_i$, $a_f$, and $a_i$, denoting position (final and initial), velocity (final and initial), and acceleration (final and initial), respectively. The solution for the coefficients is then given by:

(Equations 38)

$$a_5 = \frac{2(\Delta t)[2(\Delta t)(a_f - a_i) - 6(v_f + v_i)] + 12(p_f - p_i)}{64(\Delta t)^5}$$

$$a_4 = \frac{2(\Delta t)[2(\Delta t)(3a_i - 2a_f) + 14v_f + 16v_i] + 30(p_i + p_f)}{32(\Delta t)^4}$$

$$a_3 = \frac{2(\Delta t)[2(\Delta t)(a_f - 3a_i) - 8v_f - 12v_i] + 20(p_f - p_i)}{16(\Delta t)^3}$$

$$a_2 = \frac{a_i}{2}, \quad a_1 = v_i, \text{ and}$$

$a_0 = p_i$, and where for the polynomial, $t_i = (k - 2)(\Delta t)$.

Therefore, the predicted value at time k+1 is:

$$x_{k+1} = a_0 + a_1(3\Delta t) + a_2(3\Delta t)^2 + a_3(3\Delta t)^3 + a_4(3\Delta t)^4 + a_5(3\Delta t)^5. \quad \text{(Equation 39)}$$

The algorithm ChooseRoot ( ) implements the above equations to find the closest xroot [ ] to the above that is within a predetermined tolerance (TOL). If there are two values within TOL, or if there are none, then a global ERROR ( ) function is called to alert the next higher control level (e.g. Level 2) that is singularity or other problem exists.

It will also be noted that the array THETAX [ ] is filled on power up with initial values of x=tan ($\theta_x/2$), and set KOUNT=7. The array THETAX [ ] is later filled with the travel history of $\theta_x$.

It will now be appreciated that the function ChooseRoot ( ) provides means for eliminating any of the roots of the eliminant which correspond to a path of travel for the movable platform outside a predetermined range of error values, represented by TOL. It will also be appreciated that the function ChooseRoot ( ), implemented on CPU1, comprises means for storing data corresponding to the historical path of travel for the movable platform (the data in the array THETAX [ ]), and means responsive to the stored path of travel data for identifying a particular one of a plurality of closed-form forward displacement solutions which corresponds to a continuous path of travel for the movable platform.

From the foregoing, those skilled in the will understand that other techniques of isolating a single final solution or root may occur to those skilled in the art.

For example, it is expressly contemplated using an angular position transducer physically associated with the apex of the polyhedron for which the angular position $\theta_x$ is being calculated. Any solution roots which produce a calculated angular position different by a predetermined error value from the measured angular position provided from the transducer will be eliminated. Moreover, if two roots are close to each other (within a predetermined tolerance), it will be known that the movable platform is near a singularity, and the higher level control algorithms (Level 2) are informed of this. The higher level control algorithms, such as Level 2 of FIG. 20, are operative to consider leg interference, stability, etc. so as to avoid singularities. Accordingly, these higher level control processes are told by Level 1 told where platform is, and decide, based on factors considered at that Level 1, whether the platform will be allowed to move through a singularity.

The function YZRoot ( ) determines the y=tan ($\theta_y/2$) and z=tan ($\theta_z/2$) that correspond to the chosen root of x. Once the tan half-angles are determined, function GetVecs ( ) has the necessary data to determine the locations of points r, s, and t. These points are the vertices of the movable platform 12. GetVecs ( ) determines each vertex point's location by two rotations and a stretch. For instance, to determine point r, start with a unit vector, which will be "massaged" into the op leg, lying in the xy plane and pointing from o towards q. This vector is rotated to the left about the z axis an angle alpha, and the resulting vector is then rotated about a unit vector pointing from o to q an angle thx. Finally, this value is scaled by the first leg length.

From the foregoing, it will be appreciated that the CPU1 of the controller 200 may be programmed as described to control a 3-3 Stewart platform, given a set of leg lengths, and the position and orientation of the movable platform 12 will be uniquely determined and can be provided to other control levels. However, it should also be understood that the special 6-6 parallel mechanisms such as shown in FIGS. 12 and 13 can be reduced to a 3-3 equivalent in software, and the function Octahedron ( ) described above then executed in the manner described to obtain the position and orientation of the movable platform 112 of these parallel mechanisms. The software for this reduction will be described next.

Software for Reduction of 6-6 Parallel Mechanism to 3-3 Stewart Platform Equivalent Turning to Appendix II, next will be described the pseudo-C code for the software modules in the Joint Coordination Module of Level 1 of FIG. 20, for reducing a special 6-6 parallel mechanism such as 100, 100' in FIGS. 12 and 13 to an equivalent 3-3 Stewart platform. The closed-form forward displacement control of a special 6-6 platform 100 is generally a two-part process. First, the special 6-6 platform 100 must be "reduced" to a 3-3 Stewart platform 10, and second, a forward displacement computation of the position and orientation of the movable platform must be effected by calling the function Octahedron ( ), described above in connection with Appendix I. The result of the call to Octahedron ( ) is the return of the desired locations of points $r_1$, $s_1$, and $t_1$ of the special 6-6 platform.

Prior to execution or motion of the mechanism, it is necessary to define constants and initialize global constants, so that they need not be calculated each time the principal operative function, denominated Forward ( ), is called. This initialization is effected by the function Init ( ), which determines the values of the coefficients A, B, C, D, E, F of Equation 31, the values of the k's and m's of Equations 32, and the values of the M's of Equation 34. The function Init ( ) is executed at power up of the controller 200 to initialize global variables. The global variable L[12] is an array which will contain the virtual edges of the octahedron defined by the special 6-6 platform, $L=[o_0r_1\ o_0s_1\ p_0s_1\ p_0t_1\ q_0t_1\ q_0r_1\ o_0p_1\ p_0q_0\ q_0o_0\ r_1s_1\ s_1t_1\ t_1r_1]$. It will be understood that all of the #define statements are a constant value determined by the geometry of the platforms 112, 114.

After the Init ( ) module has been executed, the last six values of the array L[n] are initialized (since they are constants) so that the array can be passed to the Octahedron ( ) function. The Reduces ( ) function fills the first six elements of the array L[n]. Given the leg lengths of the special 6-6 platform, the leg lengths of the "virtual" 3-3 platform must be calculated. The array RealLegs [n] contains the values of the actual leg lengths, determined by the position encoder, while the array Legs [n], when filled, contains the "virtual" leg lengths of a "virtual" 3—3 Stewart platform. The Reduces ( ) function is passed the array RealLegs [n] and returns Legs [n].

As described, the principal operative routine is the Forward ( ) function. This function is passed the array RealLegs [n], and it in turn calls the function Reduces ( ), followed by Octahedron ( ). The function Octahedron ( ) returns the values of r1, s1, and t1, the coordinates of the movable platform 112, in the manner described above.

Also shown in Appendix II is an example pseudocode segment for the Joint Coordination Module of Level 1 of FIG. 20. This main program main ( ) for CPU1, is operative to control the position and orientation of the movable platform in a Cartesian closed-loop fashion as shown in FIG. 8B, by executing the function Forward ( ) for implementing the closed-form forward displacement controller 51 of FIG. 8B, and by executing the function Reverse ( ) for implementing the reverse displacement controller 41 of FIG. 8B. Inasmuch as the reverse displacement computation is considered within the skill of the art, and having been fully discussed above, no further discussion of same will be provided herein.

From the foregoing, it will now be appreciated from an inspection of Appendix II that the overall main program main ( ) for the Joint Coordination Module for Level 1 calls the function Init ( ), after which there are repeated calls to Forward ( ) each time it is desired to determine the position and orientation of the movable platform, in accordance with a command to move the platform to a desired location, coupled with position encoder inputs received during the movement of the platform. It should now be clear that Forward ( ) is responsive to encoder values corresponding to the detected leg lengths and provides the Cartesian coordinates of the movable platform as outputs, while Reverse ( ) receives a set of Cartesian coordinates as the desired position for the movable platform and provides as an output an array WantLegs [ ] corresponding to the commanded encoder values (a commanded leg length) for a given leg controller 43 of FIG. 8B. The I0-toLEVEL2 ( ) function is executed between calls to Forward ( ) and Reverse ( ) so as to exchange the commanded Cartesian position and actual Cartesian position information to higher level control processes of Level 2 of FIG. 20. In this manner, the present invention comprises a significant operative elements of a closed-loop Cartesian controller for parallel mechanisms as described herein.

The foregoing has been a description of the structure and operation of the preferred embodiments of parallel mechanisms which can be controlled in accordance with a closed-form forward displacement methodology. It will be appreciated that other alternative functions and sequences of operation of the system may be performed by the structure described herein while still remaining within the scope of the present invention. It will be appreciated by those skilled in the art that the system and software disclosed herein may be arranged so that the functional operation of the system may be readily modified by changing certain circuit connections or by changing the program or sequence of the software. Thus, it will be appreciated that the foregoing description has been merely illustrative, and that the present invention is limited solely by the appended claims.

Prior Art Open-Loop Cartesian Reverse Displacement Control

In order to gain an appreciation of the need for the closed-form forward displacement control method of the present invention, it is helpful to review the prior art reverse displacement control and iterative forward displacement control methodologies. Referring now to FIGS. 6 and 7, in the case of a general 6-6 platform 10˝, the base platform 14´ comprises the six points labeled O, P, Q, R, S, and T. An ($\vec{i}\ \vec{j}\ \vec{k}$) coordinate system has been chosen on this platform, with the origin at O. The unit vector $\vec{i}$ denotes the X-axis, the unit vector $\vec{j}$ is the Y-axis, and the unit vector $\vec{k}$ is the Z-axis. The locations of the six points forming the base platform are known, because the points always lie in the XY plane with the point P lying on the X-axis.

The movable hexagonal platform 12′ consists of the six points $o, p, q, r, s,$ and $t$. A $(\vec{u}\ \vec{v}\ \vec{w})$ coordinate system has been chosen for this platform, with its origin at $o$. The unit vector $\vec{u}$ denotes the coordinate system's x-axis, and the unit vectors $\vec{v}$ and $\vec{w}$, respectively, denote this coordinate system's y- and z-axes. The locations of the six points describing the movable platform 12′ are known with respect to the movable platform's coordinate system, i.e., they lie in its $xy$ plane, with point $p$ lying on the x-axis.

The vector $\vec{x}_o = \vec{x}$ extends from point O of the base platform 14′ to point $o$ of the upper platform 12′, and consider that its value is expressed in terms of the base coordinate system. The length of the leg extending from O to $o$ is then calculated as the magnitude of $\vec{x}$, which is $\|\vec{x}\|$.

The unit vectors $\vec{u}$, $\vec{v}$, and $\vec{w}$ are known in terms of the base coordinate system. Then, the position vectors extending along the other five legs can be calculated by relations such as for leg P-p:

$$\vec{x}_p = \vec{x} + [R]\vec{p} - \vec{P}, \qquad \text{(Equation 1)}$$

complicated than a reverse displacement analysis, and this stems from the fact that for a given set of leg lengths (and the dimensions of the two platforms), there are a number of different possible closures, and hence, a number of different solutions of $\vec{x}$, $\vec{u}$, and $\vec{w}$. A closed-form solution for this problem is expressible by a single polynomial (in a single variable) whose degree denotes the maximum number of closures.

The prior art, however, suggest that the forward displacement analysis can be only done purely iteratively for all of these parallel mechanisms: the 3-3, the 6-3, the special 6-6, and the more complicated general 6-6. Accordingly, the closed-loop controller 50 in FIG. 8B carries with it all of the hazards and the drawbacks that hinder the iterative solution technique. For the purposes of illustrating the common prior art, the iterative forward displacement analysis will next be described for the general 6-6 platform of FIGS. 6 and 7.

Firstly, in using the iterative method, initial guesses of the vectors $\vec{x}$, $\vec{u}$, and $\vec{w}$ are required, after which there occurs an optimization process that minimizes the differences between an actual set of leg lengths and a guessed set.

Consider that the actual given set of leg lengths is the 6x1 vector $\underline{L}_0$. For a guessed position and orientation of the upper platform, $\vec{x}$, $\vec{u}$, and $\vec{w}$, the corresponding guessed leg lengths $\underline{L}$ can be obtained by a reverse displacement analysis, $\underline{L} = \underline{L}(\vec{x}, \vec{u}, \vec{w})$. Then, a scalar function of the difference between the given leg lengths and the guessed leg lengths is represented by:

$$C(\underline{X} = \vec{x}, \vec{u}, \vec{w}) = \frac{1}{2}(\underline{L} - \underline{L}_0)^T(\underline{L} - \underline{L}_0)$$

(Equation 2)

where $C(\underline{X})$ represents a semi-positive scalar function and T represents the transpose operator. When the scalar function vanishes, then one solution to the forward displacement analysis is obtained. In other words, when the Equation 2 is minimized, i.e., $$\underline{X}^{k+1} = \underline{X}^k + \nabla \underline{S}$$

(Equation 5)

In practice, the initial guess $\underline{X}^0$ of $\vec{x}$, $\vec{u}$, $\vec{w}$ is the last known location of the top or movable platform 12′. Thus, the forward displacement analysis converges to the final solution vector $\underline{X}^*$ within a finite number of steps (iterations). This minimization technique is however subject to the following equality constraints:

$$\vec{u} \cdot \vec{w} = 0 \text{ and } \vec{u} \cdot \vec{u} = \vec{w} \cdot \vec{w} = 1.$$

(Equation 6)

These equality constraints of Equation 6 derive from the fact that $\vec{u} \perp \vec{w}$ and they are unit vectors. Based on this iterative solution to the forward displacement analysis, it is known that the motion of the movable platform can "outrun" the algorithm that locates it. In other words, the number of iterations required to determine the position and orientation of the movable platform within an acceptable degree of accuracy is sufficiently high that practical limitations on the velocity and acceleration of the platform must be imposed by other control mechanisms, so that the platform does not attain an unknown or uncertain position.

Other numerical problems occur when [J] tends to be singular. This happens near regions where multiple closures exist, and in these regions, it is possible that the iterative forward displacement control methodology will even jump to a wrong closure, since there is no way to distinguish between closures.

Closed-Form Forward Displacement Control for 3-3 Platform

In the present invention, a closed-form solution for the geometry of a 3-3 Stewart-type platform has been discovered, and $C(\underline{X} = \underline{X}^*) = 0$ because $\underline{L} = \underline{L}_0$, the forward displacement analysis is solved by an optimization process.

The minimization is typically done in prior art controllers with a first order search, which is one that depends on the first derivative of the objective function, $C(\underline{X})$. Consider that the error value $\underline{\varepsilon} = \underline{L} - \underline{L}_0$ and consider that the nine element vector $\underline{X}$ contains the three vectors $\vec{x}, \vec{u},$ and $\vec{w}$. Then, a 6x9 Jacobian [J] necessary to define a direction of steepest descent is obtained as:

$$[J] = \begin{bmatrix} \frac{\partial \varepsilon_1}{\partial X_1} & \frac{\partial \varepsilon_1}{\partial X_2} & \cdots & \frac{\partial \varepsilon_1}{\partial X_9} \\ \frac{\partial \varepsilon_2}{\partial X_1} & \frac{\partial \varepsilon_2}{\partial X_2} & \cdots & \cdots \\ & & & \frac{\partial \varepsilon_6}{\partial X_9} \\ \cdots & \cdots & \cdots & \end{bmatrix}$$

where $X_1$ is the $\vec{i}$ component of $\vec{x}$, $X_2$ is the $\vec{j}$ component of $\vec{x}$, ..., and $X_9$ is the $\vec{k}$ component of $\vec{w}$. Hence, an infinitesimal change in the solution vector, $\delta \underline{X}$, will result in an infinitesimal change in the error vector, $\delta \underline{\varepsilon}$, and they are related by:

$$\delta \underline{\varepsilon} = [J] \, \delta \underline{X}$$

(Equation 3)

The direction of steepest decent $\nabla \underline{S}$ is the negative of the gradient (which can be obtained from differentiating (Equation 2) with respect to each component of $\underline{X}$):

$$\nabla \underline{S} = -G \, [J]^T \, \underline{\varepsilon}$$

(Equation 4)

where G is a scalar gain that defines the optimum step magnitude. The $\nabla \underline{S}$ can be used to determine a new guess that will make $C(\underline{X})$ smaller in the optimization process:

What is claimed is:

1. A motion system capable of motion in six degrees of freedom, comprising:
    a base platform providing at least three points of connection in a first plane;
    a movable platform providing at least three points of connection in a second plane;
    at least six linearly extensible support members extending from said points of connection in said base platform to said points of connection on said movable platform;
    coupling means for providing said linearly extensible support members with at least two rotation degrees of freedom at said points of connection; and
    closed-form forward displacement control means, coupled to said linearly extensible support members, (1) for determining, in response to selective changes in the lengths of said linearly extensible members, at least one closed-form forward displacement solution of the geometry of a structure formed by said movable platform, said base platform, and said linearly extensible support members, such structure being reducible to an equivalent octahedron, and (2) for providing control signals in response to said solutions, said control signals being used to produce predictable motion of said movable platform.

2. The motion system of claim 1, wherein said points of connection in said first plane and said points of connection in said second plane are distinct.

3. The motion system of claim 1, wherein there are exactly six distinct points of connection in said first plane and exactly six distinct points of connection in said second plane, wherein the resultant mechanism is a special 6-6 platform.

4. The motion system of claim 1, wherein said linearly extensible support members comprise actuatable linearly extensible members for a motion producing system.

5. The motion system of claim 4, wherein said system comprises the motion system for a flight or motion simulator.

6. The motion system of claim 4, wherein said system comprises a heavy object lifting machine.

7. The motion system of claim 4, wherein said actuatable linearly extensible members comprise hydraulic cylinders.

8. The motion system of claim 1, wherein said linearly extensible support members comprise passive force resistant members for a motion and force determination system.

9. The motion system of claim 1, wherein said closed-form forward displacement control means comprises:
    transducer means for acquiring the lengths of lines of said structure, said lines comprising virtual octahedron edges extending between said movable platform and said base platform;
    computing means responsive to said acquired line lengths for computing at least one closed-form forward displacement solution of the geometry of said structure; and
    determining means responsive to said at least one closed-form forward displacement solution for determining the position and orientation of said movable platform relative to said base platform.

10. The motion system of claim 9, wherein said computing means provides a plurality of closed-form forward displacement solutions, some of said solutions corresponding to imaginary solutions or to impossible discontinuous paths of travel of said movable platform, and further comprising:

means for storing in a memory data corresponding to a path of travel for said movable platform;

means responsive to said stored path of travel data for identifying a particular one of said plurality of closed-form forward displacement solutions which corresponds to a real, continuous path of travel of said movable platform; and means for providing said identified particular one of said closed-form forward displacement solutions as one angular coordinate of said movable platform relative to said base platform.

11. The motion system of claim 1, further comprising:

means for providing Cartesian coordinate position commands indicative of a commanded Cartesian coordinate position for said movable platform;

reverse displacement control means responsive to said Cartesian coordinate position commands for providing leg length commands;

leg control means responsive to said leg length commands for actuating selective changes in the lengths of said linearly extensible support members; and means for sensing the lengths of said linearly extensible support members and for providing actual leg length signals; and wherein said closed-form forward displacement control means is responsive to said actual leg length signals for determining and providing Cartesian coordinates of the actual position and orientation of said movable platform as feedback to said Cartesian coordinate position command means, thereby forming a closed-loop Cartesian controller for said motion system.

12. A motion system capable of motion in six degrees of freedom, comprising:

a base platform comprising at least three points defining a base plane, said three points in said base plane defining a first triangle;

a movable platform providing at least three points defining a second plane, said three points in said second plane defining a second triangle;

at least six linearly extensible support members extending between said base platform and said movable platform, each of said support members being actuatable for a motion-producing system and/or alternatively being passively-force resistant for a motion-sensing system, each of said support members being connected (1) from a first single point of connection on a line defined by any two of said at least three points in said first plane on said base platform, said first single point of connection being distinct from any other first single point of connection of any other support member, (2) to a corresponding second single point of connection on a line defined by any two of said at least three points in said second plane on said second triangle, said second single point of connection being distinct from any other second single point of connection of any other support member, for imparting or allowing motion of said movable platform relative to said base platform in accordance with selective changes in the lengths of said support members, at least three of said support members being connected at the apices of said first triangle and at least three of said support members being connected at the apices of said second triangle; and control means, coupled to said linearly extensible support members, for actuating or responsive to selective changes in the lengths of said support members, and for producing predictable movement of said movable platform when said support members are actuatable or sensing movement of said movable platform when said support members are passively force-resistant.

13. The motion system of claim 12, wherein said system is utilized in a flight or motion simulator, and further comprising means on said movable platform for experiencing motion effects produced by movement of said movable platform.

14. The motion system of claim 12, wherein said system is utilized as a force/torque sensor, further comprising means for sensing the lengths of said support members, and wherein said control means is responsive to detect changes in the lengths of said support members by said sensing means and to compute forces and/or torques applied to the movable platform in response to said detected changes.

15. The motion system of claim 12, wherein each of three of said support members are connected from an apex of said first triangle on said base platform to an apex of said second triangle of said movable platform.

16. The motion system of claim 12, wherein each of three of said support members are connected from an apex of said first triangle on said base platform to a point along a side of said second triangle of said movable platform.

17. The motion system of claim 12, wherein each of three of said support members are connected from an apex of either said first triangle of said base platform or said second triangle of said movable platform to a distinct point of connection on a line created by two of the points defining said triangles but not on the sides of said triangles.

18. The motion system of claim 12, wherein said control means comprises closed-form forward displacement control means for determining at least one closed-form forward displacement solution of the geometry of a structure formed by said movable platform, said base platform, and said linearly extensible support members, such structure being reducible to an equivalent octahedron, for closed-loop control of the position and orientation of said movable platform.

19. The motion system of claim 18, wherein said closed-form forward displacement control means comprises:

transducer means for acquiring the lengths of lines of said structure, said lines comprising virtual octahedron edges extending between said movable platform and said base platform;

computing means responsive to said acquired line lengths for computing at least one closed-form forward displacement solution of said structure; and determining means responsive to said at least one closed-form forward displacement solution for determining the position and orientation of said movable platform relative to said base platform.

20. The motion system of claim 19, wherein said computing means provides a plurality of closed-form forward displacement solutions, some of said solutions corresponding to imaginary solutions or to impossible discontinuous paths of travel of said movable platform, and further comprising:

means for storing in a memory data corresponding to a path of travel for said movable platform;

means responsive to said stored path of travel data for identifying a particular one of said plurality of closed-form forward displacement solutions which corresponds to a real, continuous path of travel of said movable platform; and means for providing said identified particular one of said closed-form forward displacement solutions as one angular coordinate of said movable platform relative to said base platform.

21. An apparatus for controlling and/or determining the position and orientation of a movable platform relative to a base platform, having linear extensible members extending between said movable platform and said base platform, given predetermined dimensions for said movable platform, said base platform, and lengths of lines of a structure formed by said movable platform, said base platform, and said linearly extensible support members, said structure being reducible to an equivalent octahedron, said lines comprising virtual octahedron edges extending between said movable platform and said base platform, the apparatus comprising:

transducer means for acquiring the lengths of said lines;

computing means responsive to said acquired line lengths for computing at least one closed-form forward displacement solution of said structure; and determining means responsive to said at least one closed-form forward displacement solution for determining the position and orientation of said movable platform relative to said base platform.

22. The apparatus of claim 21, wherein said linear extensible members are co-linear with said lines extending between said movable platform and said base platform, and said lengths of said lines are provided from linear position transducers associated with said linear extensible members.

23. The apparatus of claim 21, wherein said apparatus is a 3-3 or a 6-3 Stewart-type platform having said linear extensible members extending from the apices of either said movable platform or the apices of said base platform, wherein said apices define a triangle.

24. The apparatus of claim 21, wherein said apparatus is a special 6-6 parallel mechanism, with said linear extensible members extending between distinct points of connection on said movable platform and distinct points of connection on said base platform.

25. The apparatus of claim 21, wherein said base platform comprises at least three points in a plane defining a first triangle, and wherein said movable platform comprises at least three points in a second plane defining a second triangle, and wherein there are six of said linear extensible members.

26. The apparatus of claim 25, wherein each of three of said linear extensible members are connected from an apex of said first triangle on said base platform to an apex of said second triangle on said movable platform.

27. The apparatus of claim 25, wherein each of three of said linear extensible members are connected from an apex of said second triangle on said movable platform to a point along a side of said first triangle on said movable platform.

28. The apparatus of claim 21, wherein said computing means provides a plurality of closed-form forward displacement solutions, some of said solutions corresponding to imaginary solutions or to impossible discontinuous paths of travel of said movable platform, and further comprising:

means for storing in a memory data corresponding to a path of travel for said movable platform;

means responsive to said stored path of travel data for identifying a particular one of said plurality of closed-form forward displacement solutions which corresponds to a real, continuous path of travel of said movable platform; and means for providing said identified particular one of said closed-form forward displacement solutions as one angular coordinate of said movable platform relative to said base platform.

29. The apparatus of claim 21, wherein said structure comprises a plurality of apices defined by the intersection of four lines extending either along the sides of said movable platform, along the sides of said base platform, or from a point of connection on an opposite platform, and wherein said computing means is operative for:

(1) determining constants corresponding to spherical four-bar linkages associated with each apex of said base platform;

(2) utilizing said constants, determining a polynomial associated with each of said spherical four-bar linkages of said base platform;

(3) assembling three polynomial equations in three variables representing angular input/output relationships for said spherical four-bar linkages, each of said three polynomial equations being bi-quadric and containing two of said three variables, (4) obtaining an eliminant polynomial in one of said three variables whose roots comprise all possible values of said one variable which exist in all possible solution sets of said three variables for said three bi-quadric polynomials;

(5) calculating all real roots of said eliminant polynomial;

(6) identifying one of said real roots of said eliminant polynomial based on predetermined root selection criteria; and (7) providing said identified one real root of said eliminant as one angular coordinate of said movable platform relative to said base platform.

30. The apparatus of claim 29, further comprising means for storing in a memory data corresponding to a path of travel for said movable platform, and wherein said predetermined root selection criteria comprises a computed continuous path of travel for said movable platform, and wherein said computing means is operative to identify said one of said real roots of said eliminant polynomial by comparing all of said real roots to said stored path of travel data and select only one of said real roots which corresponds to said continuous path of travel.

31. The apparatus of claim 21, further comprising means for determining the Cartesian coordinates of said movable platform relative to said base platform utilizing said at least one closed-form forward displacement solution.

32. A method for controlling and/or determining, with a computer, the position and orientation of a movable platform relative to a base platform, having linear extensible members extending between said movable platform and said base platform, given predetermined dimensions for said movable platform, said base platform, and lengths of lines of a structure formed by said movable platform, said base platform, and said linearly extensible support members, said structure being reducible to an equivalent octahedron, said lines comprising virtual octahedron edges extending between said movable platform and said base platform, the method comprising the steps of:

(1) acquiring the lengths of said lines;

(2) utilizing said acquired line lengths, computing at least one closed-form forward displacement solution of the geometry of said structure; and (3) utilizing said at least one closed-form forward displacement solution, determining the position and orientation of said movable platform relative to said base platform.

33. The method of claim 32, wherein said linear extensible members are co-linear with said lines extending between said movable platform and said base platform, and said lengths of said lines are provided from linear position transducers associated with said linear extensible members.

34. The method claim 32, wherein said apparatus is a 3-3 or a 6-3 Stewart-type platform having said linear extensible members extending from the apices of either said movable platform or the apices of said base platform, wherein said apices define a triangle.

35. The method of claim 32, wherein a plurality of closed-form forward displacement solutions are determined, some of said solutions corresponding to imaginary solutions or to impossible discontinuous paths of travel of said movable platform, and further comprising the steps of:

storing in a memory data corresponding to a path of travel for said movable platform;

utilizing said stored path of travel data, identifying a particular one of said plurality of closed-form forward displacement solutions which corresponds to a real, continuous path of travel of said movable platform; and providing said identified particular one of said closed-form forward displacement solutions as one angular coordinate of said movable platform relative to said base platform.

36. The method of claim 32, wherein said structure comprises a plurality of apices defined by the intersection of four lines extending either along the sides of said movable platform, along the sides of said base platform, or from a point of connection on an opposite platform, and wherein the step of computing at least one closed-form forward displacement solution of the geometry of said structure comprises the steps of:

(1) determining constants corresponding to spherical four-bar linkages associated with each apex of said base platform;

(2) utilizing said constants, determining a polynomial associated with each of said spherical four-bar linkages of said base platform;

(3) assembling three polynomial equations in three variables representing angular input/output relationships for said spherical four-bar linkages, each of said three polynomial equations being bi-quadric and containing two of said three variables, (4) obtaining an eliminant polynomial in one of said three variables whose roots comprise all possible values of said one variable which exist in all possible solution sets of said three variables for said three bi-quadric polynomials;

(5) calculating all real roots of said eliminant polynomial;

(6) identifying one of said real roots of said eliminant polynomial based on predetermined root selection criteria;

(7) providing said identified one real root of said eliminant as one angular coordinate of said movable platform relative to said base platform;

(8) determining the other two angular coordinates of said movable platform relative to said base platform; and (9) responsive to said angular coordinates of said movable platform relative to said base platform, determining the Cartesian coordinates of said movable platform.

37. The method of claim 36, wherein said predetermined root selection criteria comprises a computed continuous path of travel for said movable platform, and wherein the step of identifying one of said real roots of said eliminant polynomial comprises the steps of:

(1) storing in a memory data corresponding to a path of travel for said movable platform;

(2) utilizing said stored path of travel data, comparing each of said real roots of said eliminant polynomial to said stored path of travel data;

(3) eliminating any of said roots which correspond to a path of travel for said movable platform outside a predetermined range of error values for said one angular coordinate of said movable platform; and (4) providing only a remaining one of said roots as said identified one real root.

38. A method for controlling and determining, with a computer, the position and orientation of a Stewart-type platform, given predetermined dimensions for a movable platform having a predetermined number of apices, a base platform having a predetermined number of apices, and leg lengths of variable positionable linear actuating means extending between said movable platform and said base platform, said leg lengths being determined by corresponding linear position transducers, comprising the steps of:

(1) acquiring from said linear position transducers the lengths of said variably positionable linear actuating means to obtain known leg lengths;

(2) storing in a memory data corresponding to a path of travel for said movable platform;

(3) utilizing said known leg lengths, determining the constants corresponding to spherical four-bar linkages associated with each apex of said base platform;

(4) utilizing said constants, determining a four-bar polynomial associated with each of said spherical four-bar linkages of said base platform;

(5) determining an eliminant polynomial corresponding to each of said four-bar polynomials;

(6) calculating all real roots of said eliminant polynomial;

(7) identifying one of said real roots of said eliminant polynomial based on a comparison of said real roots to said stored path of travel data; and (8) providing to a controller said identified one real root of said eliminant as one angular coordinate of said movable platform relative to said base platform, said controller being adapted to use said one real root to generate positional feedback information and to control the position of said movable platform in response to said positional feedback information.

39. The method of claim 38 wherein said stored path of travel is utilized to compute a projected continuous path of travel for said movable platform, and wherein the step of identifying one of said real roots of said eliminant polynomial comprises the steps of:
  (1) comparing each of said real roots of said eliminant polynomial to said stored path of travel data;
  (2) eliminating any of said roots which correspond to a path of travel for said movable platform outside a predetermined range of error values for said one angular coordinate of said movable platform; and
  (3) providing only a remaining one of said roots as said identified one real root.

40. The method of claim 38, further comprising the step of utilizing said one angular coordinate of said movable platform relative to said base platform to determine remaining angular coordinates of said movable platform relative to said base platform.

41. The method of claim 40, further comprising the step utilizing said angular coordinates of said movable platform relative to said base platform to determine Cartesian coordinates of said movable platform relative to said base platform, and providing said Cartesian coordinates to said controller as positional feedback.

42. A method for controlling and determining, with a computer, the position and orientation of a Stewart-type equivalent parallel mechanism, given predetermined dimensions for a movable platform, a base platform, and leg lengths of variably positionable linear actuating members extending between said movable platform and said base platform, said leg lengths being determined by corresponding linear position transducers, comprising the steps of:
  (1) acquiring from said linear position transducers the lengths of said variably positionable linear actuating members to obtain known leg lengths;
  (2) storing in memory data corresponding to a path of travel for said movable platform;
  (3) assembling twelve edge lengths of a virtual octahedron corresponding to said movable platform, said base platform, and said known leg lengths;
  (4) utilizing said twelve edge lengths, determining spherical four-bar linkages associated with the apices of said base platform;
  (5) computing a set of constant coefficients of an input-output relation corresponding to each of said spherical four-bar linkages associated with said base platform apices;
  (6) assembling three polynomial equations in three variables representing angular input/output relationships for said spherical four-bar linkages, each of said three polynomial equations being bi-quadric and containing two of said three variables,
  (7) obtaining an eliminant polynomial in one of said three variables whose roots comprise all possible values of said one variable which exist in all possible solution sets of said three variables for said three bi-quadric polynomials;
  (8) calculating all real roots of said eliminant polynomial;
  (9) identifying one of said real roots of said eliminant polynomial based on predetermined root selection criteria;
  (10) providing said identified one real root of said eliminant as one angular coordinate of said movable platform relative to said base platform;
  (11) determining the remaining angular coordinates of said movable platform utilizing said first calculated coordinate;
  (12) determining Cartesian coordinates of said movable platform relative to said base platform utilizing said angular coordinates; and
  (13) providing said Cartesian coordinates of said movable platform as positional feedback to a controller adapted to control the position of said movable platform in response to said positional feedback.

43. The method of claim 42, wherein the method is carried out in a controller for the parallel mechanism in real time, and further comprising the steps of:
  (14) receiving a positional command corresponding to a desired end position and orientation of said movable platform relative to said base platform; and
  (15) generating drive signals to said linear actuating member to cause said movable platform to begin movement in a commanded direction relative to said base platform;
  periodically carrying out the steps (1)–(15) to obtain positional feedback as to the position and orientation of said movable platform relative to said base platform during movement;
  removing said drive signals when said movable platform reaches said desired end position.

44. The method of claim 43, wherein the Stewart-type mechanism is utilized as the motion system of a flight simulator, and wherein said positional commands are provided to generate accelerations, decelerations, and orientations of said movable platform relative to said base platform to simulate movement of an aircraft.

45. A system for controlling and determining the position and orientation of a Stewart-type platform, given predetermined dimensions for a movable platform, a base platform, and leg lengths of variably positionable linear actuating members extending between said movable platform and said base platform, comprising:
  transducer means for acquiring the lengths of said variably positionable linear actuating members to obtain known leg lengths;
  means for storing in memory data corresponding to a path of travel for said movable platform;
  means for assembling data corresponding to the edge lengths of an octahedron formed by said movable platform, said base platform, and said known leg lengths;
  means responsive to said edge length data for determining spherical four-bar linkages associated with the apices of said base platform;
  means for computing a set of constant coefficients of an input-output relation corresponding to each of said spherical four-bar linkages associated with said base platform apices;
  means for assembling three polynomial equations in three variables representing angular input/output relationships for said spherical four-bar linkages, each of said three polynomial equations being bi-quadric and containing two of said three variables,
  means for obtaining an eliminant polynomial in one of said three variables whose roots comprise all possible values of said one variables which exist in all possible solution sets of said three variables for said three bi-quadric polynomials;
  means for calculating all real roots of said eliminant polynomial;
  means for identifying one of said real roots of said eliminant polynomial based on predetermined root selection criteria;

means for providing said identified one real root of said eliminant as one angular coordinate of said movable platform relative to said base platform;

means responsive to said one angular coordinate for determining the remaining angular coordinates of said movable platform;

means responsive to said angular coordinates for determining Cartesian coordinates of said movable platform relative to said base platform; and feedback means for providing said Cartesian coordinates of said movable platform as positional feedback to a controller adapted to control the position of said movable platform in response to said positional feedback.

46. The system of claim 45, wherein said path of travel data storing means, said edge length data assembling means, said spherical four-bar linkage determining means, said coefficient computing means, said polynomial providing means, said eliminant polynomial means, said root calculating means, said root identifying means, said angular coordinate determining means, said Cartesian coordinate determining means, and said feedback means comprises a programmed computer.

47. The system of claim 46, further comprising: means for receiving from an external controller a positional command corresponding to a desired end position and orientation of said movable platform relative to said base platform;

reverse displacement control means responsive to said positional command for determining commanded leg lengths;

means responsive to said commanded leg lengths for generating drive signals to said linear actuating members to cause said movable platform to begin movement in a commanded direction relative to said base platform;

means for causing said programmed computer to periodically provide said Cartesian coordinates to said external controller as positional feedback as to the position and orientation of said movable platform relative to said base platform during movement; and means associated with said programmed computer for removing said drive signals when said movable platform reaches said desired end position.

48. The system of claim 47, wherein the Stewart-type platform is utilized as the motion system of a flight simulator, and wherein said positional commands are provided by said external controller to generate accelerations, decelerations, and orientations of said movable platform relative to said base platform to simulate movement of an aircraft.

49. A method for controlling and/or determining the position and orientation of a movable platform relative to a base platform, with each one of six linear extensible members connected between a distinct point of connection on said base platform and a distinct point of connection on said movable platform, given predetermined dimensions for said movable platform and said base platform, the method comprising the steps of:

(1) determining an equivalent octahedron structure based on a structure comprising said linear extensible members, said movable platform, and said base platform, the equivalent octahedron structure including virtual lines extending between said movable platform and said base platform;

(2) acquiring the lengths of said virtual lines;

(3) utilizing said acquired line lengths, computing at least one closed-form forward displacement solution of the geometry of said equivalent geometric structure; and (4) utilizing said at least one closed-form forward displacement solution, determining the position and orientation of said movable platform relative to said base platform.

50. The method of claim 49, wherein said platform has said linear extensible members extending between apices on said movable platform and apices on said base platform.

51. The method of claim 49, wherein a plurality of closed-form forward displacement solutions are determined, some of said solutions corresponding to discontinuous paths of travel of said movable platform, and further comprising the steps of:

storing in a memory data corresponding to a path of travel for said movable platform;

utilizing said stored path of travel data, identifying a particular one of said plurality of closed-form forward displacement solutions which corresponds to a real, continuous path of travel of said movable platform; and providing said identified particular one of said closed-form forward displacement solutions as one angular coordinate of said movable platform relative to said base platform.

52. The method of claim 49, wherein said solvable geometric structure is defined by a plurality of apices defined by the intersection of four lines extending either along the sides of said movable platform, along the sides of said base platform, or from a point of connection on an opposite platform, and wherein the step of computing at least one closed-form forward displacement solution comprises the steps of:

(1) determining constants corresponding to spherical four-bar linkages associated with each apex of said base platform;

(2) utilizing said constants, determining a polynomial associated with each of said spherical four-bar linkages of said base platform;

(3) assembling three polynomial equations in three variables representing angular input/output relationships for said spherical four-bar linkages, each of said three polynomial equations being bi-quadric and containing two of said three variables, (4) obtaining an eliminant polynomial in one of said three variables whose roots comprise all possible values of said one variable which exist in all possible solution sets of said three variables for said three bi-quadric polynomials;

(5) calculating all real roots of said eliminant polynomial;

(6) identifying one of said real roots of said eliminant polynomial based on predetermined root selection criteria;

(7) providing said identified one real root of said eliminant as one angular coordinate of said movable platform relative to said base platform;

(8) determining the other two angular coordinates of said movable platform relative to said base platform; and (9) in response to said angular coordinates of said movable platform relative to said base platform, determining the Cartesian coordinates of said movable platform.

53. The method of claim 52, wherein said predetermined root selection criteria comprises a computed continuous path of travel for said movable platform, and wherein the step of identifying one of said real roots of said eliminant polynomial comprises the steps of:
   (1) storing in a memory data corresponding to a path of travel for said movable platform;
   (2) utilizing said stored path of travel data, comparing each of said real roots of said eliminant polynomial to said stored path of travel data;
   (3) eliminating any of said roots which correspond to a path of travel for said movable platform outside a predetermined range of error values for a coordinate of said movable platform; and
   (4) providing only a remaining one of said roots as said identified one real root.

54. A control system for use in a closed-loop Cartesian controller for a parallel mechanism having a movable platform, a base platform, and a plurality of linearly extensible legs supporting said movable platform relative to said base platform, comprising:
   means for receiving Cartesian coordinate position commands indicative of a commanded Cartesian coordinate position and orientation for said movable platform from a higher level control source external to said control system;
   reverse displacement control means responsive to said Cartesian coordinate position commands for providing leg length commands corresponding to a desired length for said legs;
   leg control means responsive to said leg length commands for actuating selective changes in the lengths of said legs;
   means for sensing the lengths of said legs and for providing actual leg length signals; and
   closed-form forward displacement control means responsive to said actual leg length signals for determining and providing Cartesian coordinate actual position and orientation signals of said movable platform as feedback to said higher level control source,
   thereby forming a closed-loop Cartesian controller for said movable platform.

55. The apparatus of claim 21, wherein said linearly extensible support members include actuatable linearly extensible members for a motion producing system.

56. The apparatus of claim 21, wherein said linearly extensible support members include passive force resistant members for a motion and force determination system.

57. The apparatus of claim 1 or 21, wherein said linearly extensible support members include force sensing members for a motion and force determination system.

58. The method of claims 32 or 49, wherein said linearly extensible support members include actuatable linearly extensible members for a motion producing system.

59. The method of claim 32 or 49, wherein said linearly extensible support members include passive force resistant members for a motion and force determination system.

60. The method of claim 32 or 49, wherein said linearly extensible support members include force sensing members for a motion and force determination system.

* * * * *